US007797710B2

(12) United States Patent
Icho et al.

(10) Patent No.: US 7,797,710 B2
(45) Date of Patent: Sep. 14, 2010

(54) CONTENT RECOMMENDATION DEVICE

(75) Inventors: Keiji Icho, Osaka (JP); Noriaki Horii, Osaka (JP); Masayuki Misaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 11/792,826

(22) PCT Filed: Dec. 15, 2005

(86) PCT No.: PCT/JP2005/023051

§ 371 (c)(1),
(2), (4) Date: Jun. 12, 2007

(87) PCT Pub. No.: WO2006/064877

PCT Pub. Date: Jun. 22, 2006

(65) Prior Publication Data

US 2008/0229360 A1    Sep. 18, 2008

(30) Foreign Application Priority Data

Dec. 17, 2004  (JP)  ............................. 2004-365688

(51) Int. Cl.
*H04N 7/10* (2006.01)
*H04N 7/025* (2006.01)
(52) U.S. Cl. ................. 725/32; 725/9; 725/34
(58) Field of Classification Search ...................... 725/34
See application file for complete search history.

(56) References Cited

U.S. PATENT DOCUMENTS 7,441,260 B1 * 10/2008 Kurapati ...................... 725/46
7,487,530 B2 * 2/2009 Azami ........................ 725/46
2001/0004733 A1 * 6/2001 Eldering ..................... 705/14
2004/0003398 A1 * 1/2004 Donian et al. ............... 725/34
2004/0078812 A1 * 4/2004 Calvert ....................... 725/46
2004/0083490 A1   4/2004 Hane
2006/0047678 A1   3/2006 Miyazaki et al.
2007/0094292 A1   4/2007 Kataoka
2007/0136753 A1 * 6/2007 Bovenschulte et al. ........ 725/46

FOREIGN PATENT DOCUMENTS

| EP | 1 684 507 | 7/2006 |
| JP | 7-135621 | 5/1995 |
| JP | 2002-142160 | 5/2002 |
| JP | 2004-206679 | 7/2004 |
| JP | 2004-355340 | 12/2004 |
| WO | 2005/048587 | 5/2005 |
| WO | 2005/064928 | 7/2005 |

* cited by examiner

*Primary Examiner*—Christopher Kelley
*Assistant Examiner*—Justin E Shepard
(74) *Attorney, Agent, or Firm*—Wenderoth, Lind & Ponack, L.L.P.

(57) ABSTRACT

Preferences of a user are analyzed with respect to each of a plurality of pieces of content already viewed by the user, and a piece viewing motivation information that is a combination of attribute entities of the piece of content is generated. A primary viewing motivation portion and a secondary viewing motivation portion are determined from the generated pieces of viewing motivation information, and pieces of viewing motivation information having a common primary viewing motivation portion are grouped together. Content having the determined primary viewing motivation portion and the secondary viewing motivation portion is selected from content not yet viewed by the user, and content information about the selected content is presented to the user in correspondence with the primary viewing motivation portion and the secondary viewing motivation portion.

11 Claims, 17 Drawing Sheets

FIG. 3

| IDENTIFICATION INFORMATION ⌒301 | BROADCAST TIME AND DATE ⌒302 | BROADCAST STATION ⌒303 | TITLE ⌒304 | DETAILS ⌒305 | GENRE ⌒306 | PERFORMER ⌒307 |
|---|---|---|---|---|---|---|
| 1070 | 9/1 20:00-20:54 | XYZ TV | WHEREABOUTS OF LOVE | HAVING RETURNED TO HIS HOMETOWN... | DRAMA | SHINJI OTAKE |
| 1071 | 9/1 21:00-22:54 | XYZ TV | HISTORICAL TRAVEL | THE HISTORY OF THE FOUNDING OF THE ROMAN EMPIRE... | HISTORY | NOBORU KUROI |
| 1072 | 9/1 23:00-23:24 | XYZ TV | NEWS X | AIM OF THE CABINET RESHUFFLE | NEWS | ERI ISHIGE |
| ... | ... | ... | ... | ... | ... | ... |

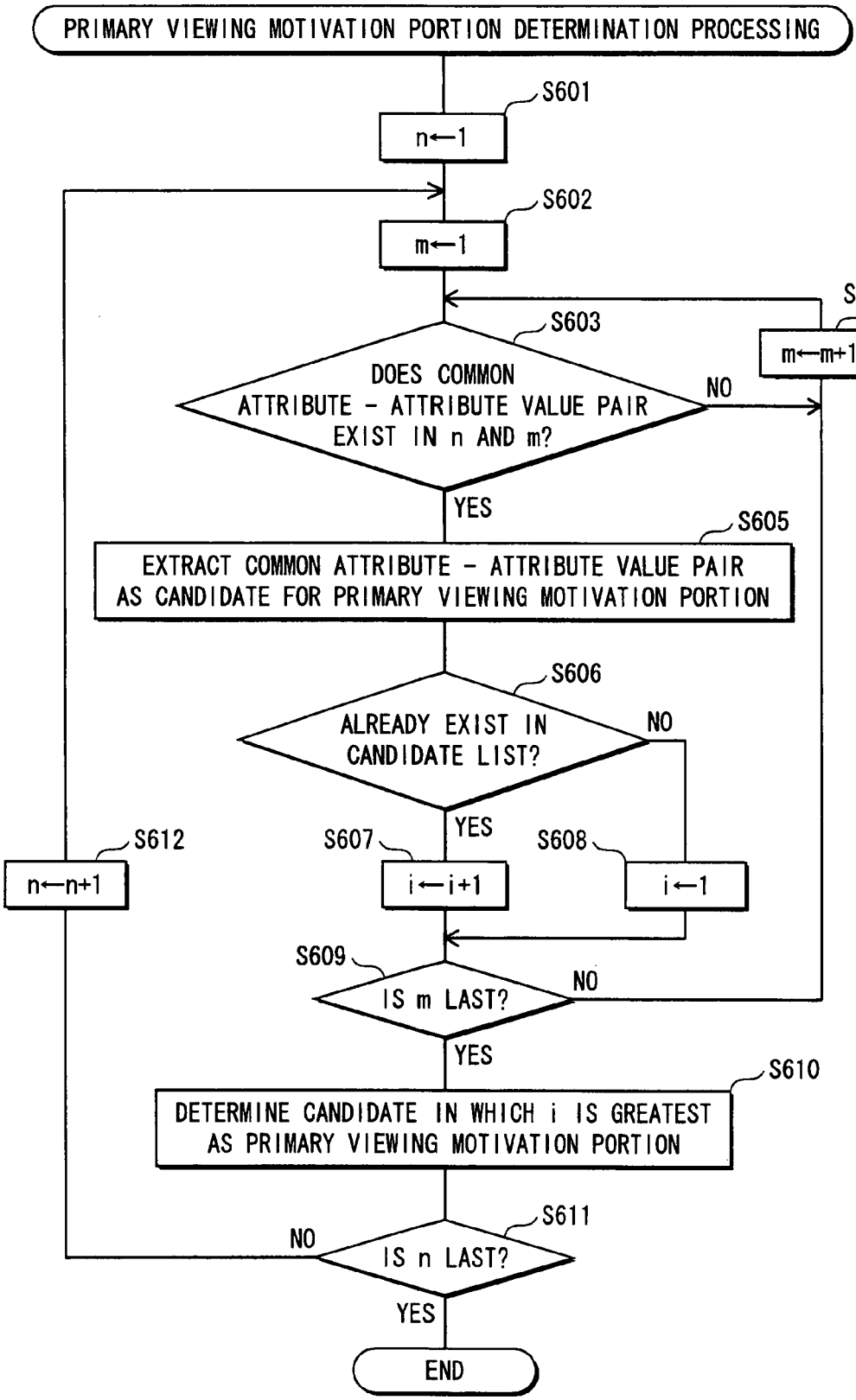

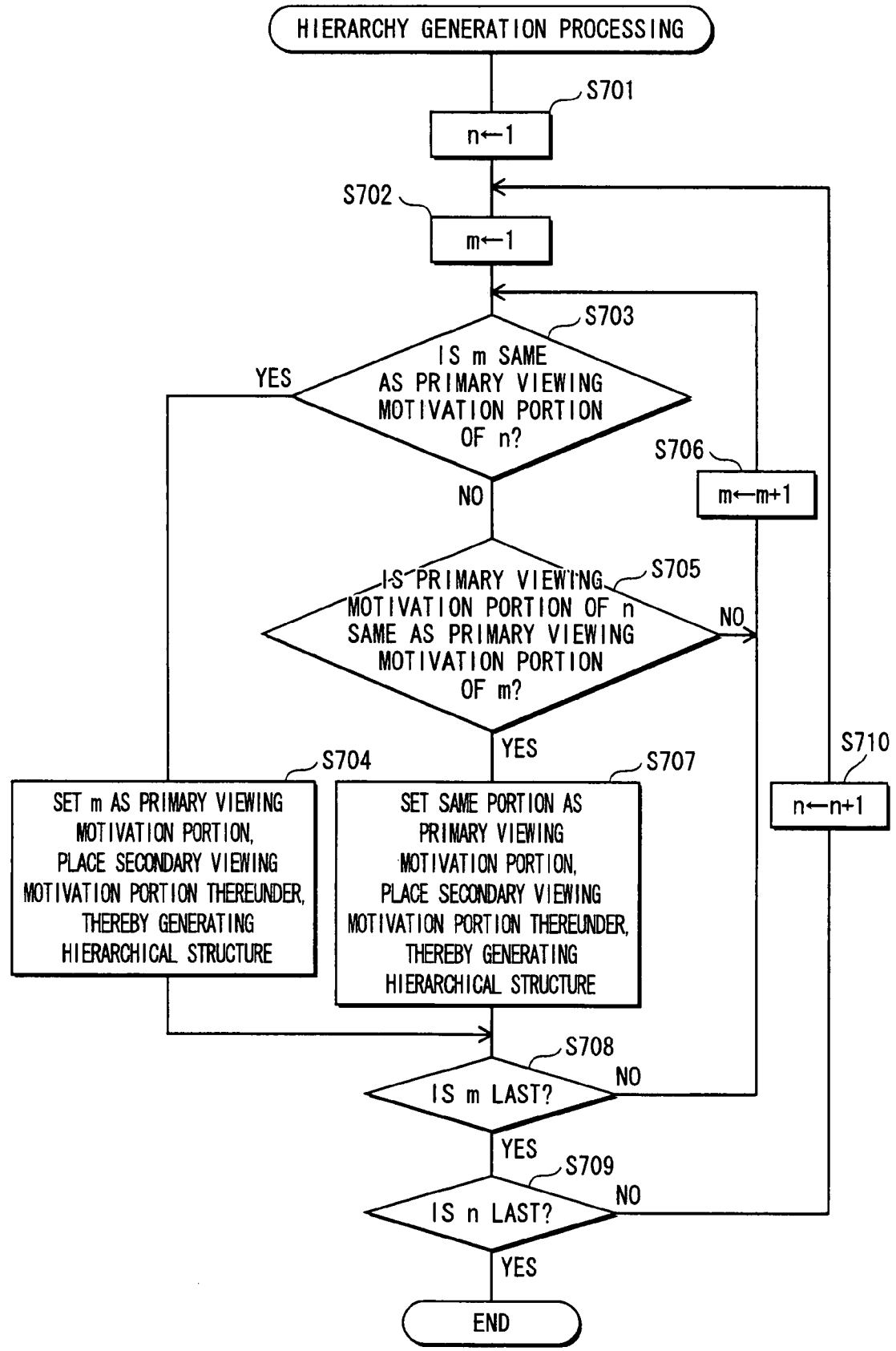

FIG. 8

CONTENT INTRODUCTION MENU FOR TARO

| CONTENT INTRODUCTION MENU | |
|---|---|
| DRAMAS WITH SHINJI OTAKE | 801 |
| 1  9/1  20:00-20:54 "WHEREABOUTS OF LOVE"  DRAMA | 804 |
| 2  9/5  21:00-21:54 "VISITOR"  DRAMA | 805 |
| 3  9/6  19:00-20:54 "ROAD TO TOMORROW"  DRAMA | 806 |
| VARIETY PROGRAMS | 802 |
| 1  9/1  21:00-21:54 "PLACE OF LAUGHS"  VARIETY | 807 |
| 2  9/7  19:00-19:54 "FALLOVER STANDUP"  VARIETY | |
| ECONOMICS-RELATED NEWS PROGRAMS (MAIASA TV) | 803 |
| 1  9/1  18:00-18:54 "STOCK INFORMATION"  NEWS | |

CONTENT INTRODUCTION MENU FOR HANAKO

| CONTENT INTRODUCTION MENU | |
|---|---|
| DRAMAS WITH DEN MORITA | |
| 1  9/1  21:00-21:54 "PLACE OF LAUGHS"  VARIETY | 809 |
| 2  9/3  21:00-21:54 "GREATEST THEATER"  VARIETY | |
| 3  9/4  19:00-20:54 "XYZ SCHOOL"  VARIETY | |
| 4  9/5  03:00-03:24 "LATE NIGHT TALK"  VARIETY | |
| 5  9/5  18:50-19:00 "IN A TRAVEL MOOD"  TRAVEL | |
| 6  9/6  20:00-20:54 "EASY COOKING CLASS"  COOKING | |
| 7  9/8  21:00-21:54 "COMEDY SCHOOL"  VARIETY | |
| DRAMAS | |
| 1  9/1  20:00-20:54 "WHEREABOUTS OF LOVE"  DRAMA | 808 |
| 2  9/2  20:00-20:54 "JOURNEY OF THE TWO"  DRAMA | |

CONTENT RECOMMENDATION DEVICE

BACKGROUND OF THE INVENTION

1. Field of Invention

The present invention relates to a technique for selecting and presenting content based on a viewing history using content information such as an EPG (Electronic Program Guide).

2. Description of the Related Art

Techniques for selecting and presenting content involve analyzing content viewed by a user in the past, selecting content that conforms with the user's preferences from among content to be broadcast in the future, and presenting information about the selected content.

Conventionally, techniques for selecting content that conform with the user's preferences based on the content viewing history and presenting content information about the selected content have been disclosed. For instance, in patent document 1, content information is treated as text information, a keyword is extracted from the content information of one content included in the viewing history, and it is calculated how frequently the extracted keyword appears in the content information of other content in the viewing history. Content for which the appearance frequency of the keyword is relatively high is then selected from among content scheduled to be broadcast, and content information about the selected content is presented.

Patent Document 1: Japanese patent application publication No. H07-135621

Patent Document 2: Japanese patent application No. 2005-515442

BRIEF SUMMARY OF THE INVENTION

However, with conventional techniques, the described processing for selecting content information that conforms with the preferences is planar processing that simply selects content information that includes keywords that appear frequently. Consequently, the selected content information is simply displayed in a list. If, for instance, the selected content is 100 or more in total and the list display extends over several pages, the operations for looking for desired content will be complicated for the user. For this reason, it is a reality that functions for selecting and displaying content information that conforms with the preferences of the user often remain unused.

The present invention was conceived in view of the described problem, and has an object of providing a content recommendation apparatus that, even when an enormous number of content is selected based on viewing history, performs display in a manner that is easily used by the user when selecting desired content from among the selection results.

In order to solve the described problem, the present invention is a content recommendation apparatus, including: a preference analysis unit operable to, with respect to each of a plurality of pieces of content already viewed by a user, analyze a preference of the user, and generate a piece of viewing motivation information that is a combination of attribute entities of the piece of content; a motivation analysis unit operable to determine a primary viewing motivation portion and a secondary viewing motivation portion for each piece of viewing motivation information, and group together pieces of viewing motivation information having a common primary viewing motivation portion; a selection unit operable to select, from among content not yet viewed by the user, one or more pieces of content having a combination of the primary viewing motivation portion and the secondary viewing motivation portion as attribute entities; and a presentation unit operable to present content information about the selected one or more pieces of content in correspondence with the primary viewing motivation portion and the secondary viewing motivation portion.

According to the stated structure, with the present invention, content information is presented in correspondence with a primary viewing motivation portion and a secondary viewing motivation portion, and therefore the user can easily ascertain the content information by viewing motivation. The time taken for user is able to find desired content can thus be reduced remarkably, therefore encouraging use of the aforementioned function.

Here, each piece of viewing motivation information may be a combination of attribute entities that, among combinations of attribute entities of the content, appears with a frequency equal to or higher than a predetermined threshold value in the content information of the plurality of pieces of already-viewed content.

According to the stated structure, if the viewing motivation information is made to be, for instance, a combination of attribute entities having an appearance frequency that is equal to or greater than a predetermined threshold value in content information of a viewed plurality of contents, the viewing motivation of the user can be ascertained. As a further example, the viewing motivation information may be a combination of, among combinations of attribute entities of content, attribute entities for which a ratio of appearance times in the content information of the already viewed pieces of content and appearance times in the content information of all content is equal to or greater than a predetermined threshold value. Here, the combination of attribute entities extracted as the viewing motivation information will be judged not only based on the appearance count in the content information of the viewed content, but as a ratio in the content information of all content. Therefore, the viewing motivation of the user can be ascertained more easily.

Here, the primary viewing motivation portion may be a combination of attribute entities that, among combinations of attribute entities included in the piece of viewing motivation information, are included most frequently in other pieces of viewing motivation information generated by the preference analysis unit, and the secondary viewing motivation portion may be a combination of attribute entities other than the attribute entities determined as the primary viewing motivation portion.

According to the stated structure, a combination of attribute entities that are particularly considered to be a motivation when the user views content can be specified from among the extracted viewing motivation information.

Here, the primary viewing motivation portion may be a combination of attribute entities that are most frequently appearing combinations of attribute entities included in the pieces of viewing motivation information, and the secondary viewing motivation portion may be a combination of attribute entities other than the attribute entities determined as the primary viewing motivation portion.

According to the stated structure, a combination of attribute entities that are particularly considered to be a motivation when the user views content can be specified from among the extracted viewing motivation information.

Here, the content recommendation apparatus may further include: a clock unit operable to clock time, wherein each one of the plurality of already-viewed pieces of content is in correspondence with a date and time of viewing, the piece of viewing motivation information for each one of the plurality of already-viewed pieces of content is a combination of, among combinations of attribute entities of content, attribute entities for which, in a predetermined period of time, a ratio of (a) appearance times in the content information of the already-viewed pieces of content and (b) appearance times in content information of all content is equal to or greater than a predetermined threshold value.

According to the stated structure, viewing motivation information in a predetermined period of time can be extracted, and therefore a localized viewing motivation can be ascertained.

Here, the primary viewing motivation portion may be a combination of attribute entities that, in the pieces of viewing motivation information in the predetermined period of time, are most frequently included in content information of content viewed within a period of time that is longer that the predetermined period of time, and the secondary viewing motivation portion may be a combination of attribute entities other than the attribute entities determined as the primary viewing motivation portion.

According to the stated structure, the combination of attribute entities that appears most frequently in a period of time that is longer than the period of time that is a target for extracting viewing motivation information is set as the primary viewing motivation portion. Therefore, the preferences of the user in the long term can be reflected.

Here, the primary viewing motivation portion may be a combination of attribute entities that, in viewing motivation information in the predetermined period of time, are included in content information of a piece of content whose date and time is oldest and is before a predetermined point in time, and the secondary viewing motivation portion may be a single attribute entity or a combination of plural attribute entities other than the attribute entities determined as the primary viewing motivation portion.

According to the stated structure, from among the viewing motivation in the predetermined period of time, a combination of attribute entities that included in the content information of content having the oldest viewing date and time, and for which the viewing date and time is before a predetermined point in time is set as the primary viewing motivation portion. Therefore, past viewing motivation information can be reflected.

Here, the grouping may be putting the primary viewing motivation portion and the secondary viewing motivation portion in a hierarchical structure by (a) (i) causing pieces of viewing motivation information having a common primary viewing motivation portion to share the main primary viewing motivation portion, or (ii) if a primary viewing motivation portion of any piece of viewing motivation information is common to any other piece of viewing motivation information, causing a common portion to be shared, and (b) placing the secondary viewing motivation portion below the shared primary viewing motivation portion, and the presentation unit may present the content information in correspondence with the primary viewing motivation portion and the secondary viewing motivation portion that have been put into the hierarchical structure.

According to the stated structure, the primary viewing motivation portion is shared. This prevents content being selected in duplicate. Furthermore, since the secondary viewing motivation portion is placed below the primary viewing motivation portion, the primary viewing motivation portion and the secondary viewing motivation portion can be put into a hierarchical structure. Accordingly, since the displayed content information is in a hierarchy, display that is easy for the user to use can be realized.

Here, the preference analysis unit may include a keyword extraction subunit operable to, based on the generated pieces of viewing motivation information, extract a characteristic keyword from newest information attached to content, or advertisement information.

According to the stated structure, content can be selected based on the expanded viewing motivation information, and presented to the user.

Here, the content recommendation apparatus may further include: an information search unit operable to, based on the pieces of viewing motivation information generated by the preference analysis unit, search for information via a network, wherein the selected one or more pieces of content include the information searched for by the information search unit.

According to the stated structure, web information can also be selected based on viewing motivation information.

BRIEF DESCRIPTION OF THE DRAWINGS

FIG. 3 shows an example of an EPG;

FIG. 6 shows a flowchart of primary viewing motivation portion determination processing;

FIG. 7 shows a flowchart of hierarchy generating processing;

FIG. 8 shows an example of GUIs generated by a GUI generation unit 217;

DETAILED DESCRIPTION OF THE INVENTION

The following describes embodiments of the present invention with reference to the drawings.

First Embodiment

Figure 1:
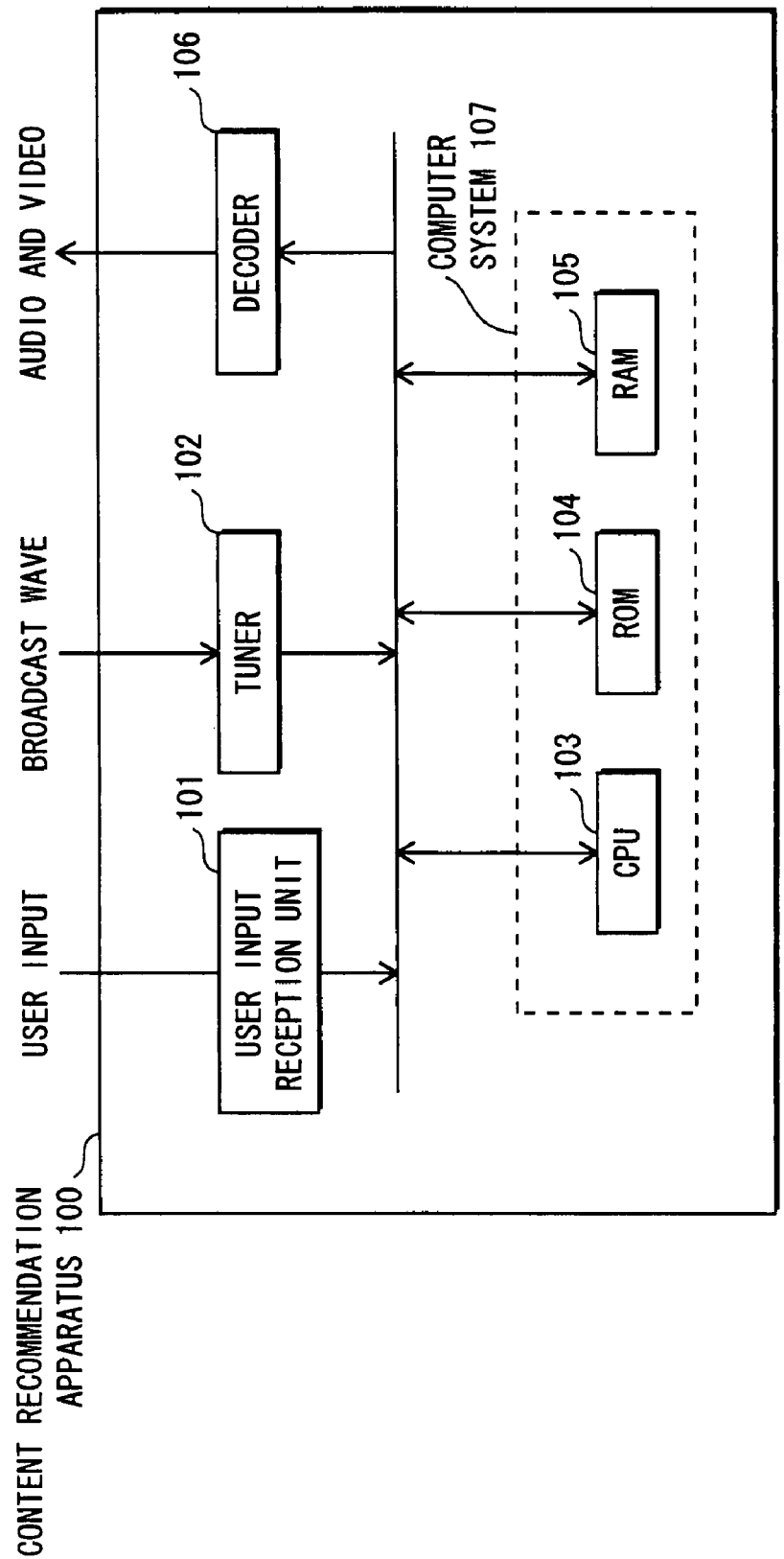
FIG. 1 shows the internal structure of a content recommendation apparatus 100 of a first embodiment.

FIG. 1 shows the internal structure of a content recommendation apparatus 100. As shown in FIG. 1, the content recommendation apparatus 100 is composed of a user input reception unit 101, a tuner 102, a CPU 103, a ROM 104, a RAM 105, and a decoder 106.

The user input reception unit 101 receives input from a user. For example, the user input reception unit 101 receives a selection of content to be viewed from the user.

The tuner 102 receives a broadcast wave, and acquires content, content information and the newest information relating to content (hereinafter referred to as newest content information).

The ROM 104 stores control programs for realizing the various processing in the content recommendation apparatus 100.

The RAM 105 is a memory for storing various types of information used in processing such as processing for selecting content that conforms with the preferences of the user.

The CPU 103, the ROM 104 and the RAM 105 constitute a computer system 107, and the content recommendation apparatus 100 achieves it functions by cooperation between hardware resources and the programs stored in the ROM 104 being read into the CPU 103.

The decoder 106 has functions including AV decoding of content, and generating a GUI for displaying content selection results.

Figure 2:
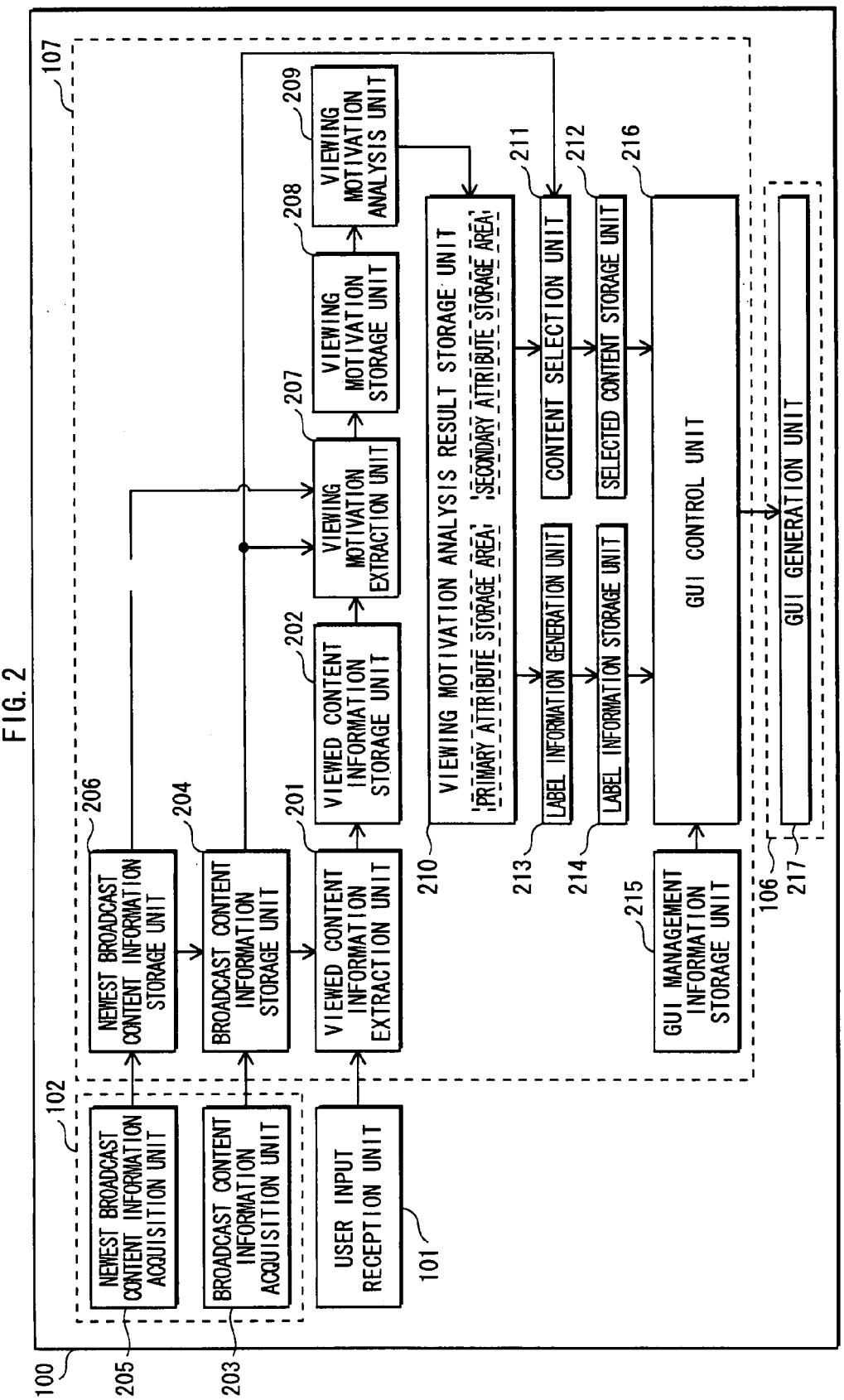
FIG. 2 is a function block diagram showing the structure of the content recommendation apparatus 100 of the first embodiment.

FIG. 2 is a function block diagram showing the structure of the content recommendation apparatus 100. As shown in FIG. 2, the content recommendation apparatus 100 is composed of a user input reception unit 101, a viewed content information extraction unit 201, a viewed content information storage unit 202, a broadcast content information acquisition unit 203, a broadcast content information storage unit 204, a newest broadcast content information acquisition unit 205, a newest broadcast content information storage unit 206, a viewing motivation extraction unit 207, a viewing motivation information storage unit 208, a viewing motivation analysis unit 209, a viewing motivation analysis result storage unit 210, a content selection unit 211, a selected content storage unit 212, a label information generation unit 213, a label information storage unit 214, a GUI management information storage unit 215, a GUI control unit 216, and a GUI generation unit 217.

The viewed content information extraction unit 201 extracts content information of content from the broadcast content information storage unit 204, based on user input received by the user input reception unit 101.

The viewed content information storage unit 202 stores content information of content extracted by the viewed content information extraction unit 201.

The broadcast content information acquisition unit 203 acquires content information broadcast from a broadcast station. FIG. 3 shows an example of an EPG in the case of the content being television programs. The EPG is composed of attributes such as identification information 301, broadcast date and time 302, broadcast station 303, title 304, details 305, genre 306, and performer 307. The entities for each attribute (hereinafter referred to as attribute values) are the text string in the frame for the corresponding attribute in FIG. 3. The attributes broadcast date and time 202 and details 205 are the results of categorizing or summarizing the values in the frames of the corresponding attributes in FIG. 3. For example, the broadcast station attribute may have an attribute value such as "XYZ TV", and the genre attribute may have the attribute value such as "drama". Furthermore, a broadcast time attribute may have an attribute value such as "evening", "prime time, Monday", or "Summer morning" that is the result of categorizing or summarizing. The details attribute may have an attribute value such as "romance", "ancient history", or "business" that is the result of categorizing or summarizing using a dictionary or the like.

The broadcast content information storage unit 204 stores content information acquired by the broadcast content information acquisition unit 203.

The newest broadcast content information acquisition unit 205 acquires the newest content information broadcast from a broadcast station.

The newest broadcast content information storage unit 206 stores the newest content information acquired by the newest broadcast content information acquisition unit 205.

The viewing motivation extraction unit 207 extracts viewing motivation information of a user with respect to viewed content, based on content information stored in the broadcast content information storage unit 204 and content information stored in the viewed content information storage unit 202.

The viewing motivation information extracted by the viewing motivation extraction unit 207 is extracted based on content information stored in the broadcast content information storage unit 204 and content information stored in the viewed content information storage unit 202, and is a single attribute-attribute value pair or a combination of plural attribute-attribute value pairs suitable for judging whether or not content is viewed. Here, "attribute-attribute value" expresses an attribute and an attribute value corresponding to that attribute.

Some examples are:

[Broadcast station: XYZ TV]

[Genre: drama]^[Performer: Shiji Otake]

[Broadcast station: XYZ TV]^[Genre: news]^[Details: economics].

Here, [Details: economics] denotes that an attribute value "economics" is included in the "details" attribute, or that the result of analyzing keywords included in the attribute value of the "details" attribute is "economics".

The viewing motivation information focuses on pairs that enable a high degree of accuracy in determining whether or not content is viewed, for example, a single attribute-attribute value pair or a combination of plural attribute-attribute value pairs that appear in the content information of viewed content, but do not appear in the content information of content not viewed. Another example is a single attribute-attribute value pair or a combination of plural attribute-attribute value pairs that appear frequently in the content information of viewed content, but appear only infrequently in the content information of content not viewed. Note that the algorithm for extracting viewing motivation information is described below.

The viewing motivation storage unit 208 stores viewing motivation information extracted by the viewing motivation extraction unit 207.

The viewing motivation analysis unit 209 divides the viewing motivation information into a primary viewing motivation portion and a secondary viewing motivation portion. Pieces of viewing motivation information having a common primary viewing motivation portion share the primary viewing motivation portion. Alternatively, if the primary viewing motivation portion of a particular piece of viewing motivation information is common with another piece of viewing motivation information, the pieces of viewing motivation information share the common portion. The viewing motivation analysis unit 209 arranges the secondary viewing motivation portion below the primary viewing motivation portion, thus putting the viewing motivation information into a hierarchical structure.

For example, when a piece of viewing motivation information extracted by the viewing motivation extraction unit 207 is a combination of plural attribute-attribute value pairs, the viewing motivation analysis unit 209 sets, as the primary viewing motivation portion, a single attribute-attribute value pair or plural attribute-attribute value pairs included in the piece of viewing motivation information and most frequently appearing in other viewing motivation information extracted by the viewing motivation extraction unit 207. A single attribute-attribute value pair or combination of plural attribute-attribute value pairs excluding the single attribute-attribute value pair or combination of plural attribute-attribute value pairs set as the primary viewing motivation portion are classified as secondary viewing motivation portions.

The extraction of the viewing motivation information by the viewing motivation extraction unit 207 and the classification processing and hierarchy generation processing of the extracted viewing motivation information by the viewing motivation analysis unit 209 may be performed from time to time as necessary, or may be performed regularly. Alternatively, this processing may be performed when designated by user input.

The viewing motivation analysis result storage unit 210 stores an analysis result obtained by the viewing motivation analysis unit 209 analyzing viewing motivation information.

The content selection unit 211 selects content that conforms with the preferences of the user, from among broadcast content such as content scheduled to be broadcast that the user has not yet viewed. This selection is performed based on the viewing motivation analysis result stored in the viewing motivation analysis result storage unit 210.

The selected content storage unit 212 stores content information of the content selected by the content selection unit 211, in correspondence with the primary viewing motivation portion and secondary viewing motivation portions that were factors in selecting the content.

The label information generation unit 213 generates label information for labeling selected content by viewing motivation, based on the viewing motivation analysis result stored in the viewing motivation analysis result storage unit 210.

As one example, the label information generation unit 213 generates label information "Dramas with ShijiOtake" from the viewing motivation information [genre: drama]^[performer: Shiji Otake].

The label information storage unit 214 stores the label information generated by the label information generation unit 213, in correspondence with the primary viewing motivation portion and secondary viewing motivation portion that were factors in generating the label information.

The GUI management information storage unit 215 stores management information for generating a GUI.

The GUI control unit 216 performs GUI control for displaying the content selected by the content selection unit 211 in correspondence with the label information generated by the label information generation unit 213, based on the management information stored in the GUI management information storage unit 215.

The GUI generation unit 217 performs GUI display under the control of the GUI control unit 216.

Figure 4:
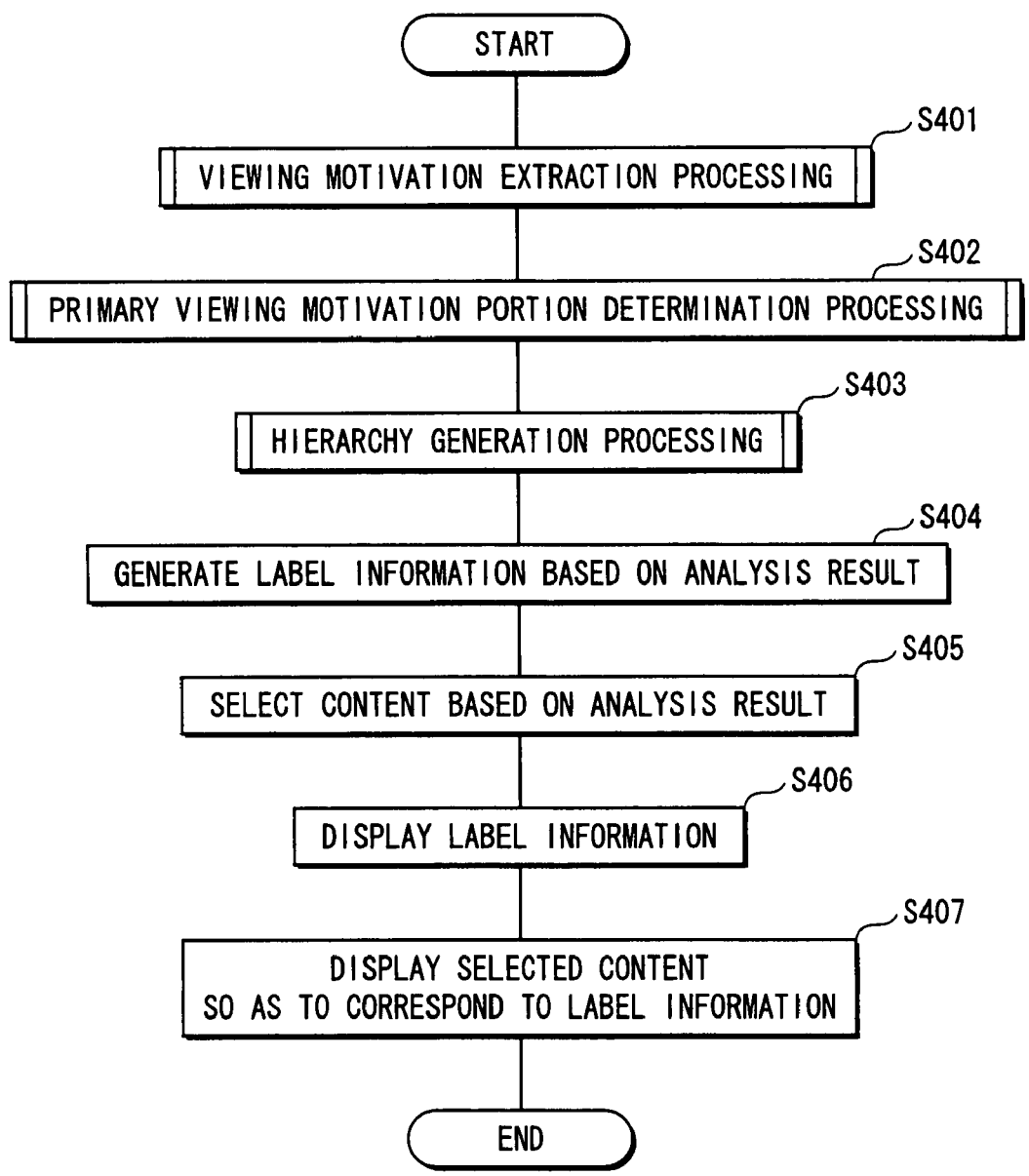
FIG. 4 shows a flowchart of operations of the content recommendation apparatus 100 of the first embodiment.

Next a description is given of operations by the content recommendation apparatus 100, with use of the flowchart shown FIG. 4. FIG. 4 shows the overall flow of operations for extracting viewing motivation information and analyzing the extracted viewing motivation information to select content based on the analysis result, through to displaying the selected content.

First, the viewing motivation extraction unit 207 extracts viewing motivation information of viewed content, based on content information stored in the broadcast content information storage unit 204 and viewed content information stored in the viewed content information storage unit 202 (step S401). Details of the processing are described below with reference to FIG. 5. After the viewing motivation information is extracted, the viewing motivation analysis unit 209 classifies the extracted viewing motivation information into a primary viewing motivation portion and a secondary viewing motivation portion (step S402). Details of the processing are described below with reference to FIG. 6. After the viewing motivation information has been classified into a primary viewing motivation portion and a secondary viewing motivation portion, these are put into a hierarchical structure (step S403). Details of the processing are described below with reference to FIG. 7. Next, based on the processing from step S401 to step S403, the label information generation unit 213 generates label information for labeling the selected content by viewing motivation (step S404). Based on the processing from step S401 to step S403, the content selection unit 211 selects content from among broadcast content such as content scheduled to be broadcast that the user has not yet viewed (step S405). The GUI control unit 216 causes the label information generated by viewing motivation by the GUI generation unit 217 to be displayed (step S406). The GUI control unit 216 performs GUI control for displaying the content selected by the content selection unit 211 in correspondence with the primary viewing motivation portion and the secondary viewing motivation portion that were the selection factors based on the GUI management information storage unit 215, and the GUI generation unit 217 displays GUI display information (step S407).

Figure 5:
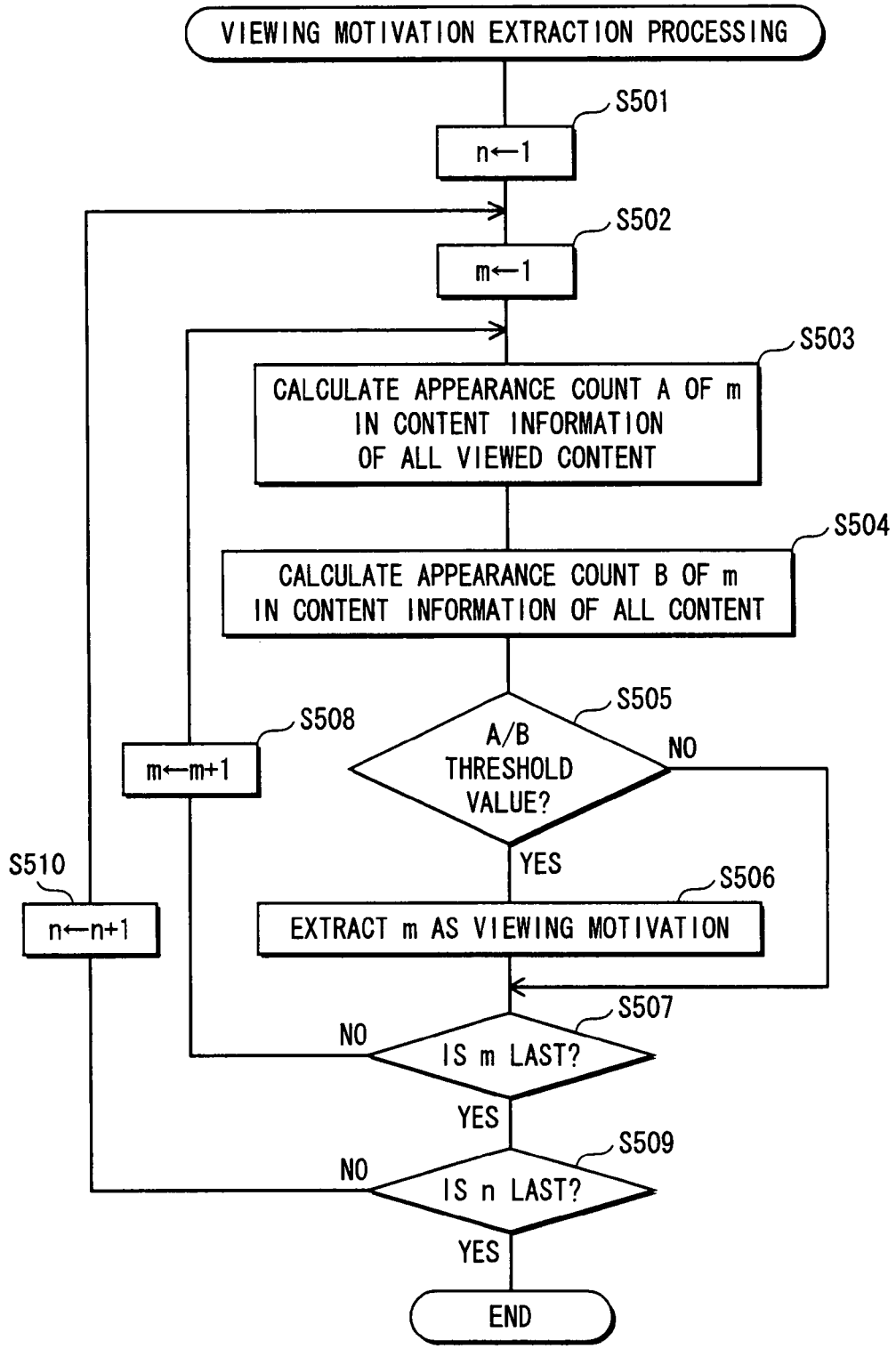
FIG. 5 is a flowchart showing analysis of viewing motivation in the first embodiment.

Next, a description is given of processing for extracting viewing motivation information at step S401, with use of the flowchart in FIG. 5. In the present flowchart, n is a variable that specifies content information of one already-viewed content. Furthermore, m is a variable that specifies one of attribute-attribute value pair combinations in the specified content information. First, n and m are initialized (steps S501, S502). Next, an appearance count A of m in the content information of all viewed content is calculated (step S503), and an appearance count B of m in the content information of all content is calculated (step S504). It is then judged whether or not A/B is equal to or greater than a predetermined threshold value (step S505), and if A/B is equal to or greater than the predetermined threshold value, m is extracted as viewing motivation information (step S506). If A/B is less than the predetermined threshold value, operations move to step S507. It is then judged whether or not m is the last (step S507), and if m is not the last, m is incremented by 1 (step S508), and operations move to step S503. If m is the last, it is then judged whether or not n is the last (step S509), and if n is not the last, n is incremented by 1 (step S510), and operations move to step S502. If n is the last, the processing ends.

Next, a description is given of processing for determining a primary viewing motivation portion from viewing motivation information at step S402, with use of the flowchart showing in FIG. 6. In the present flowchart, n is a variable that specifies one piece of viewing motivation information among extracted viewing motivation information. Furthermore, m is a variable that specifies one piece of viewing motivation information among the extracted viewing motivation information, other than the piece of viewing motivation information specified by n. In addition, i is a variable specifying an inclusion rate of one primary viewing motivation portion with respect to other viewing motivation information. First, n and m are initialized (steps S601, S602). Then, n and m are compared, and it is judged whether or not a common attribute-attribute value pair exists (step S603). When a common attribute-attribute value pair does not exist, m is incremented by 1 (step 604), and operations move to step S603. When a common attribute-attribute value pair exists, the common attribute-attribute value pair is extracted as a candidate for the primary viewing motivation portion of n (step S605). Next, it is judged whether or not the extracted primary viewing motivation portion of n already exists in a candidate list (step S606), and if so, i is incremented by 1 (step S607). If the extracted primary viewing motivation portion of n does not already exist in the candidate list, it is newly added thereto, and i is set to 1 (step S608). It is then judged whether or not m is the last (step S609), and if m is not the last, operations move to step S604. If m is the last, a primary viewing motivation portion candidate having the greatest value of i among the candidates in the candidate list is set as the primary viewing motivation portion of n (step S610). It is judged whether or not n is the last (step S611), and if n is not the last, n is incremented by 1 (step S612), and operations move to step S602. If n is the last, the processing ends.

Next, a description is given of processing for generating a hierarchical structure at step S403, with use of the flowchart showing in FIG. 7. In the present flowchart, n is a variable that specifies one piece of viewing motivation information among the extracted viewing motivation information. Furthermore, m is a variable that specifies one piece of viewing motivation information among the extracted viewing motivation information, other than the piece of viewing motivation information specified by n. First, n and m are initialized (steps S701, S702), n and m are compared, and it judged whether m is the same as the primary viewing motivation portion of n (step S703). If m is the same, m is set as the primary viewing motivation portion, and the secondary viewing motivation portion is arranged below the primary viewing motivation portion, thereby generating a hierarchical structure (step S704). If m is not the same, it is judged whether the primary viewing motivation portion of n and the primary viewing motivation portion of m are the same (step S705). If the two are not the same, m is incremented by 1 (step S706), and operations move to step S703. If the two are the same, the same portion is set as the primary viewing motivation portion, and the secondary viewing motivation portion is arranged below the primary viewing motivation portion, thereby generating a hierarchical structure (step S707). Next, it is judged whether or not m is the last (step S708), and if m is not the last, operations move to step S706. If m is the last, it is then judged whether or not n is the last (step S709), and if n is the last, n is incremented by 1 (step S710), and operations move to step S702. If n is the last, the processing ends.

Through the processing shown in FIG. 5 to FIG. 7, the viewing motivation of a user organized into a hierarchical structure is obtained. Next, a detailed description is given of presentation of content information selected based on the user viewing motivation that has been organized into a hierarchical structure.

FIG. 8 shows examples of GUIs displayed by the GUI generation unit 217 under the control of the GUI control unit 216, and shows examples of GUIs for two users, namely Taro and Hanako. As shown in FIG. 8, label information that is stored in the label information storage unit 214 is displayed, and the selected content stored in the selected content stored unit 214 are displayed grouped by the corresponding label information. This enables the user to ascertain the selected content by viewing motivation.

Next, a description is given of user operations when a content introduction menu such as shown in FIG. 8 is displayed. The user Taro first selects a desired label information group from among label information 801, 802 and 803 by moving the cursor shown on the label information 801 in FIG. 8 up and down. If, for instance, the user has selected the label information 801, the user then selects content that he wishes to view from among the content information 804, 805 and 806 by moving the cursor shown on the content information 804 in FIG. 8 up and down. By confirming the selection, the content will be viewed. Since a label information group is first selected, and then desired content is selected from the group, the effort for the user is markedly reduced compared to a case in which the selected content is simply displayed in a list because the user does not have to vaguely search for content.

Furthermore, as shown by the content information 804 and the content information 808, and by the content information 807 and the content information 809 in FIG. 8, a same content is displayed in different label groups in the GUI for the user Taro and the GUI for the user Hanako. This means that each user can ascertain the content selected on the basis of his or her individual viewing motivations.

Figure 9:
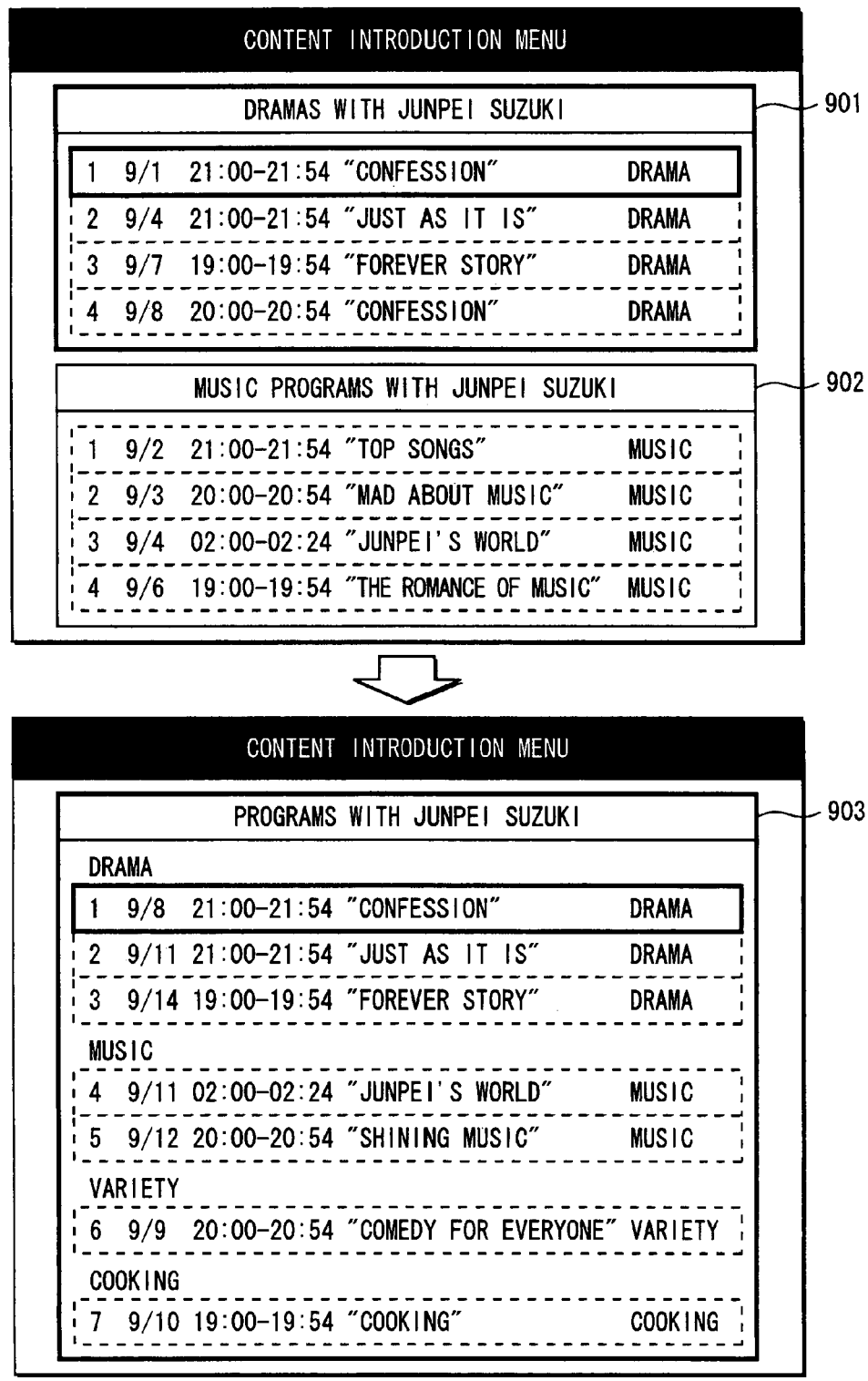
FIG. 9 shows an example of changes in GUIs generated by the GUI generation unit 217.
Figure 10:
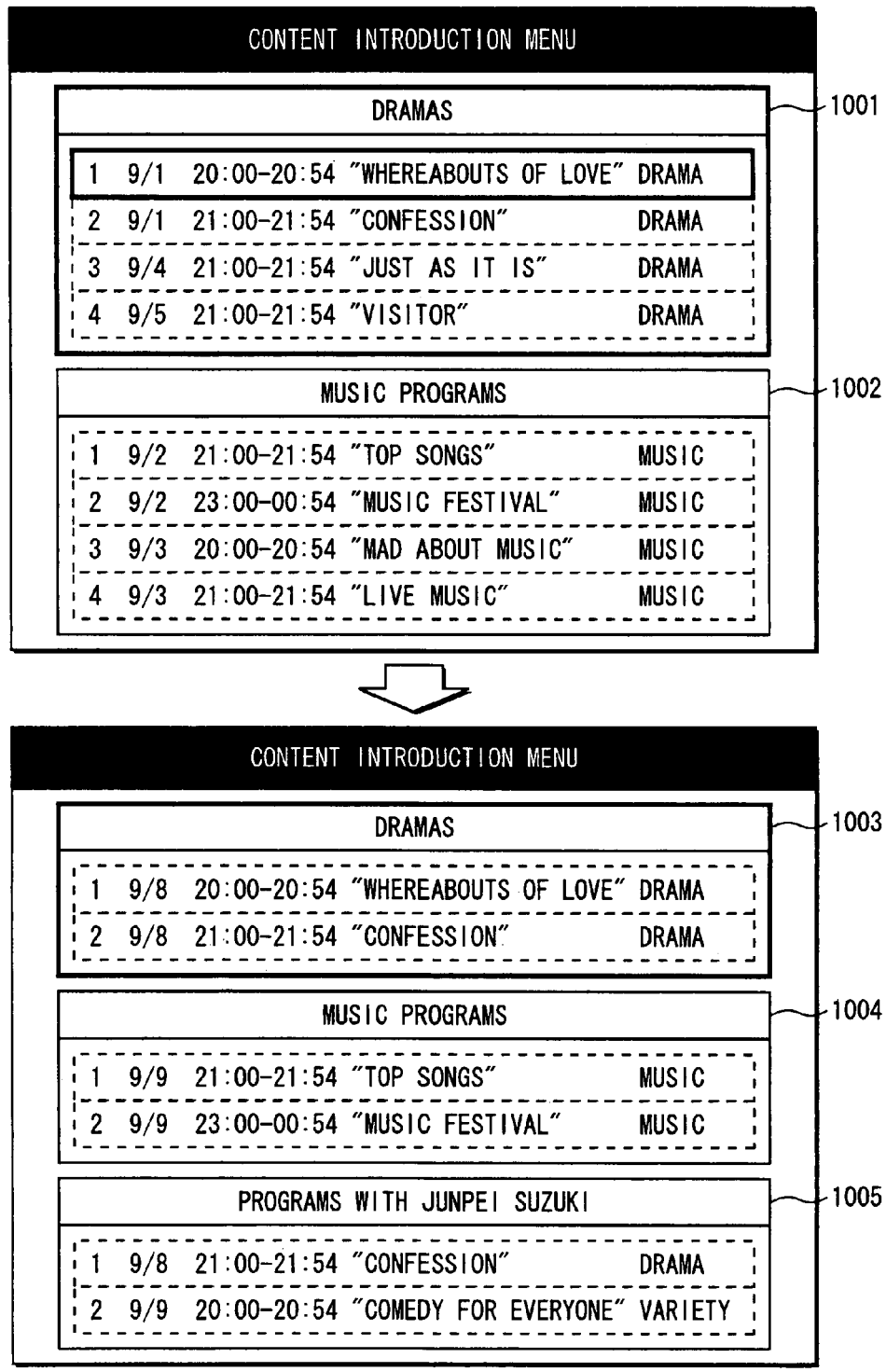
FIG. 10 shows an example of changes in GUIs generated by the GUI generation unit 217.

FIG. 9 and FIG. 10 show examples of how GUI display changes when viewing motivations are reconstructed from time to time as necessary by the viewing motivation extraction unit 207 and the viewing motivation analysis unit 209.

The upper part of FIG. 9 shows display in the case of, for example,

[genre: drama]^[performer: Junpei Suzuki]→[view], and
[genre: music]^[performer: Junpei Suzuki]→[view]

are the extracted viewing motivation information. Next, for instance, viewing motivation is reconstructed as a result of more content having been viewed by the user, and viewing motivation information, for example,

[genre: variety]^[performer: Junpei Suzuki]→[view], and
[genre: cooking]^[performer: Junpei Suzuki]→[view]

is also extracted in other genres. The lower part of FIG. 9 shows an example of how the GUI changes when, due to a common attribute-attribute value pair being extracted in a genre that is equal to or greater than a specific threshold value, the above-described viewing motivation information is grouped under viewing motivation information

[performer: Junpei Suzuki]→[view], and re-constructed. In other words, when the viewing motivation is reconstructed due to the user having viewed more content, [performed: Junpei Suzuki] is made the primary viewing motivation portion and shared, and [genre: drama], [genre: music], [genre: variety] and [genre: cooking] become the secondary viewing motivation portion.

As shown in FIG. 9, the label information 901 and 902 are updated to become label information 903, and the selected content is displayed grouped under the label information 903. Furthermore, as shown under the label information 903, the recommended programs may be shown by genre in the single viewing motivation group.

The upper part of FIG. 10 shows display in a case in which, for example,

[genre: drama]→[view], and
[genre: music]→[view]

are the extracted viewing motivation information. Next, for instance, viewing motivation is reconstructed as a result of more content having been viewed by the user, and viewing motivation information, for example,

[genre: drama]^[performer: Junpei Suzuki]→[view], and
[genre: music]^[performer: Junpei Suzuki]→[view]

that was included in the above viewing motivation information is extracted, and viewing motivation information, for example,

[genre: variety]^[performer: Junpei Suzuki]→[view], and
[genre: cooking]^[performer: Junpei Suzuki]→[view]

is also extracted in other genres. The lower part of FIG. 10 shows an example of how the GUI changes when, due to a common attribute-attribute value pair being extracted in a genre that is equal to or greater than a specific threshold value, the above-described viewing motivation information is grouped under viewing motivation information

[performer: Junpei Suzuki]→[view]

and reconstructed.

As shown in FIG. 10, the label information 1001 and 1002 is updated to become label information 1003, 1004 and 1005, and label information 1005 is newly displayed as a grouping.

As has been described, according to the present embodiment, extracted viewing motivation information is classified into a primary viewing motivation portion and secondary viewing motivation information and put into a hierarchical structure. The displayed content information is thus in a hierarchy, and the user is able to find desired content easily.

Note that when a piece of viewing motivation information extracted by the viewing motivation extraction unit 207 is a combination of plural attribute-attribute value pairs, the piece of viewing motivation information may be divided such that a single attribute-attribute value pair or a combination of plural attribute-attribute value pairs included in the piece of viewing motivation information and having a highest appearance frequency calculated by the viewing motivation extraction unit 207 is set as the primary viewing motivation portion, and a single attribute-attribute value pair or a combination of plural attribute-attribute value pairs other than that set as the primary viewing motivation portion is set as the secondary viewing motivation portion.

Figure 11:
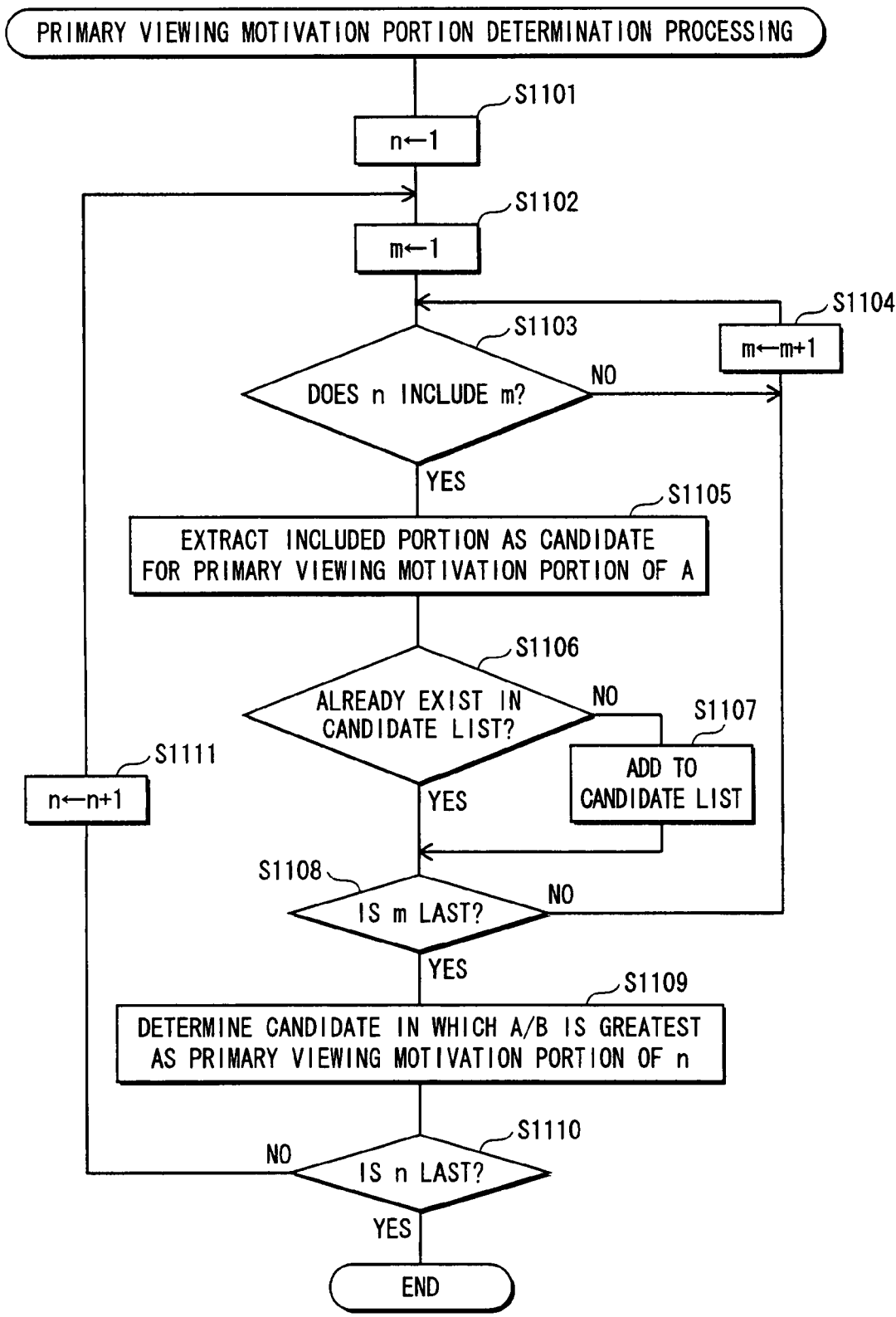
FIG. 11 shows a flowchart of primary viewing motivation portion determination processing.

A description of processing for determining the primary viewing motivation portion in the above-described case is given with use of FIG. 11. In the present flowchart, n is a variable that specifies one piece of viewing motivation information among extracted viewing motivation information. Furthermore, m is a variable that specifies one piece of viewing motivation information among the extracted viewing motivation information, other than the piece of viewing motivation information specified by n. In addition, A is an appearance count of m in the content information of all viewed content, and B is an appearance count of m in all content. First, n and m are initialized (steps S1101 and S1102). Next, n and m are compared, and it is judged whether or not n includes m (step S1103). When n does not include m, m is incremented by 1 (step S1104), and operations move to step S1103. When n does include m, m is extracted as a candidate for the primary viewing motivation portion of n, and added to the primary viewing motivation candidate list (step S1105). Next, it is judged whether or not the extracted primary viewing motivation portion of n already exists in the candidate list (step S1106). When the extracted primary viewing motivation portion of n does not already exist in the candidate list, it is newly added to the candidate list (step S1107). It is then judged whether or not m is the last (step S1108), and if m is not the last, operations move to step S1104. If m is the last, the candidate for which A/B is greatest among the primary viewing motivation portion candidates in the candidate list is set as the primary viewing motivation portion of n (step S1109). It is then judged whether or not n is the last (step S1110), and if n is not the last, n is incremented by 1 (step S1111), and operations move to step S1102. If n is the last, the processing ends.

Second Embodiment

Figure 12:
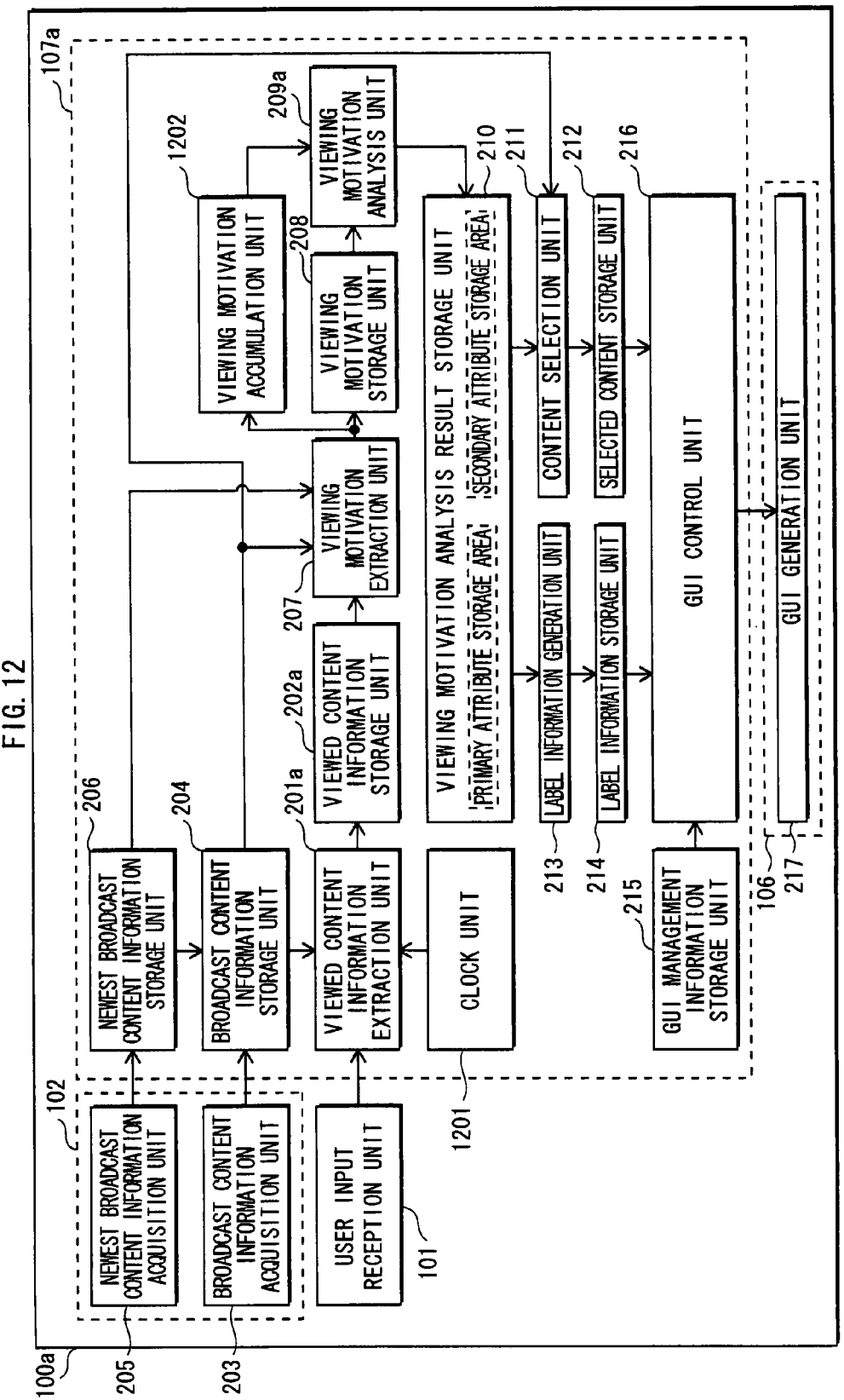
FIG. 12 is a function block diagram showing the structure of a content recommendation apparatus 100a of a second embodiment.

The present embodiment relates to extracting long-term preferences. Past viewing motivation information is accumulated, and long-term preferences are extracted that reflect this accumulated viewing motivation. To achieve this, a content recommendation apparatus 100a of the present embodiment as shown in FIG. 12 includes a computer system 107a, a clock unit 1201 and a viewing motivation accumulation unit 1202 in addition to the structure of the first embodiment.

The clock unit 1201 clocks the time and date.

The viewing motivation accumulation unit 1202 accumulates past viewing motivation information, and outputs the accumulated information to the viewing motivation analysis unit 209.

Furthermore, the viewed content information extraction unit 201a of the present embodiment extracts content information of content from the broadcast content information storage unit 204 based on user input received by the user input reception unit 101. The viewed content information extraction unit 201a also receives, from the clock unit 120, the time and date at which the content information was extracted, and puts these in correspondence with the content information.

The viewed content information storage unit 202a of the present embodiment stores the corresponded content information extracted by the content information extraction unit 201a and time and date clocked by the clock unit 1201.

The viewing motivation analysis unit 209a of the present embodiment, when for example a piece of viewing motivation information extracted by the viewing motivation extraction unit 207 is a combination of plural attribute-attribute value pairs, sets, as the primary viewing motivation portion, a single attribute-attribute value pair or plural attribute-attribute value pairs included in the piece of viewing motivation information and most frequently appearing in viewed content information whose time and date stored in the viewed content information storage unit 202a is within a certain period. The viewing motivation analysis unit 209a sets, as the secondary viewing motivation portion, a single attribute-attribute value pair or a combination of plural attribute-attribute value pairs, other than the single attribute-attribute value pair or a combination of plural attribute-attribute value pairs set as the primary viewing motivation portion.

Figure 13:
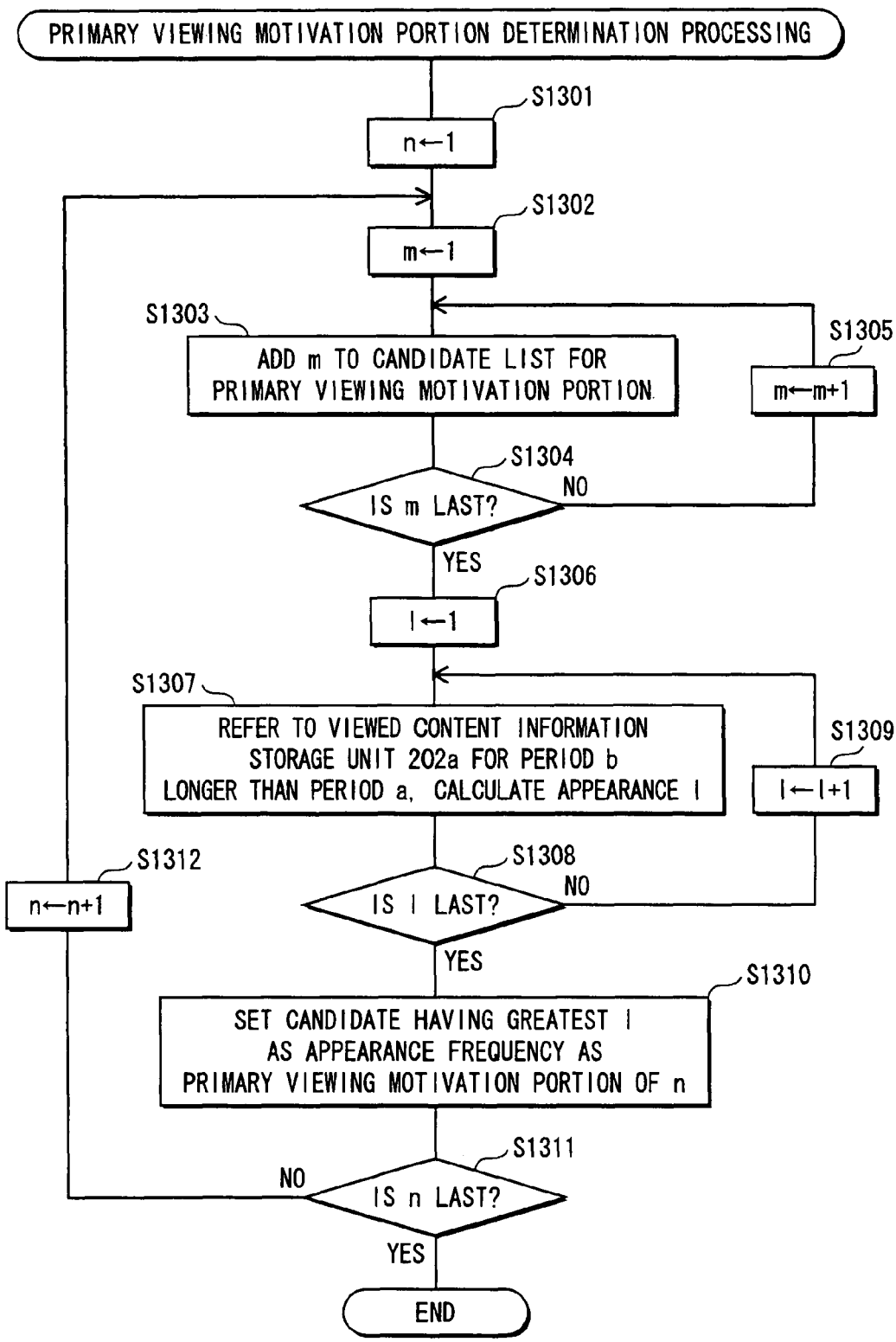
FIG. 13 shows a flowchart of primary viewing motivation portion determination processing in the second embodiment.

Next a description of operations for determining the primary viewing motivation portion from the viewing motivation information is given with use of the flowchart shown in FIG. 13. In the present flowchart, n is a variable that specifies one piece of viewing motivation information among viewing motivation information extracted during a period a. Furthermore, m is a variable that specifies one of attribute-attribute value combinations composing the piece of viewing motivation information specified by n. In addition, l is a variable that specifies one primary viewing motivation portion candidate. First, n and m are initialized (steps S1301, S1302). Next, m is added to the candidate list for the primary viewing function portion (step S1303), and it is judged whether m is the last (step S1304). If m is not the last, m is incremented by 1 (step S1305), and operations move to step S1303. If m is the last, l is initialized (step S1306). The viewed content information storage unit 202 is referred to, and the appearance frequency of l in a period b, which is longer than the period a, is calculated (step S1307). It is judged whether or not l is the last (step S1308). If l is not the last, l is incremented by 1 (step S1309), and operations move to step S1307. If l is the last, the candidate having the greatest appearance frequency during period b among the candidates for the primary viewing motivation portion in the candidate list is set as the primary viewing motivation portion of n (step S1310). It is then judged whether or not n is the last (step S1311). If n is not the last, n is incremented by 1 (step S1312), and operations move to step S1302. If n is the last, the processing ends.

According to the stated embodiment, content can be selected that reflects viewing motivation information for the user in the long-term. As has been described, the viewed content information storage unit is referred to with the target period being a period of time longer than the period for which viewing motivation information was extracted, and from among the combinations constituting the viewing motivation information, the combination of the attribute-attribute value pair that has the highest appearance frequency is set as the primary viewing motivation portion. As a result, an attribute-attribute value pair combination included in past viewing motivation information can be fixed as the primary viewing motivation part when displayed. Therefore, the display that is easy for the user to use can be realized.

Note that when the piece of viewing motivation information extracted by the viewing motivation extraction unit 207 is a combination of plural attribute-attribute value pairs, a single attribute-attribute value or plural attribute-attribute value combinations included in the piece of viewing motivation information and having a viewing date and time that is (i) the oldest in the viewed content information that includes the combination and (ii) is prior to a predetermined point in time may be set as the primary viewing motivation portion.

Figure 14:
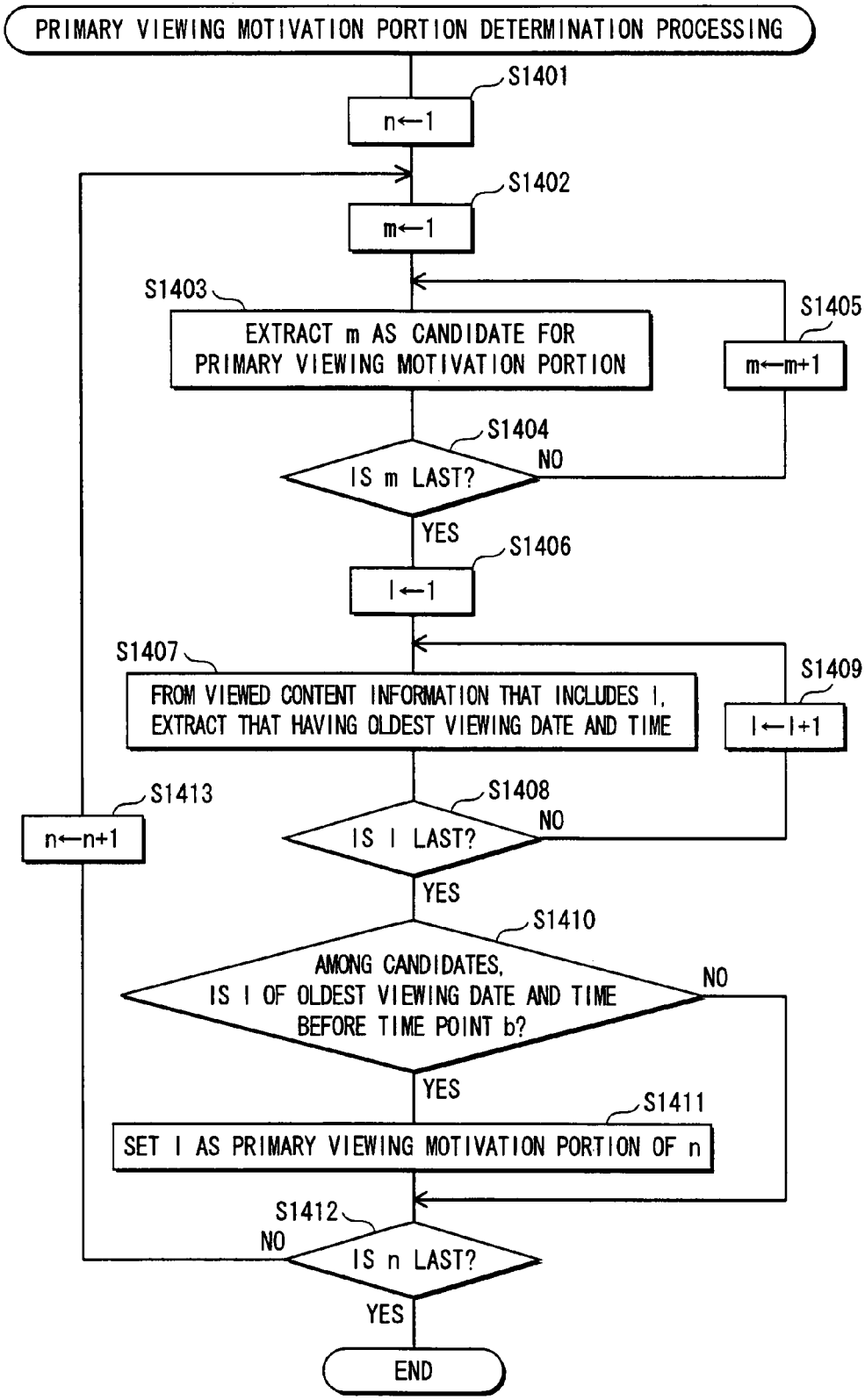
FIG. 14 shows a flowchart of primary viewing motivation portion determination processing in the second embodiment.

Furthermore, a single attribute-attribute value pair or combination of plural attribute-attribute value pairs, other than the single attribute-attribute value pair or combination of plural attribute-attribute value pairs set as the primary viewing motivation portion, may be set as the secondary viewing motivation portion. A description of processing for determining the primary viewing motivation portion in the above case is given with use of the flowchart shown in FIG. 14. Here, n is a variable that specifies one piece of viewing motivation information among viewing motivation information extracted during a period a. Furthermore, m is a variable that specifies one of attribute-attribute value combinations that constitute the piece of viewing motivation information specified by n. In addition, l is a variable that specifies one of primary viewing motivation portion candidates. First, n and m are initialized (steps S1401, S1402). Next, m is added to the candidate list for the primary viewing motivation portion (step S1403), and it is judged whether or not m is the last (step S1404). If m is not the last, m is incremented by 1 (step S1405), and operations move to step S1403. If m is the last, l is initialized (step S1406). The viewed content information storage unit 202 is then referred to, and from among viewed content including l, and that having the oldest viewing date and time is extracted (step S1407). Next, it is judged whether or not l is the last (step S1408). If l is not the last, l is incremented by 1 (step S1409), and operations move to step S1407. If l is the last, it is judged whether the l that has the oldest viewing date and time of the candidates is prior to a point in time b (step S1410). If l is prior to the point in time b, l is set as the primary viewing motivation portion of n (step S1411). If l is not prior to the point in time b, operations move to step S1412. It is then judged whether or not n is the last (step S1412). If n is not the last, n is incremented by 1 (step S1413), and operations move to step S1402. If n is the last, the processing ends.

Third Embodiment

Figure 15:
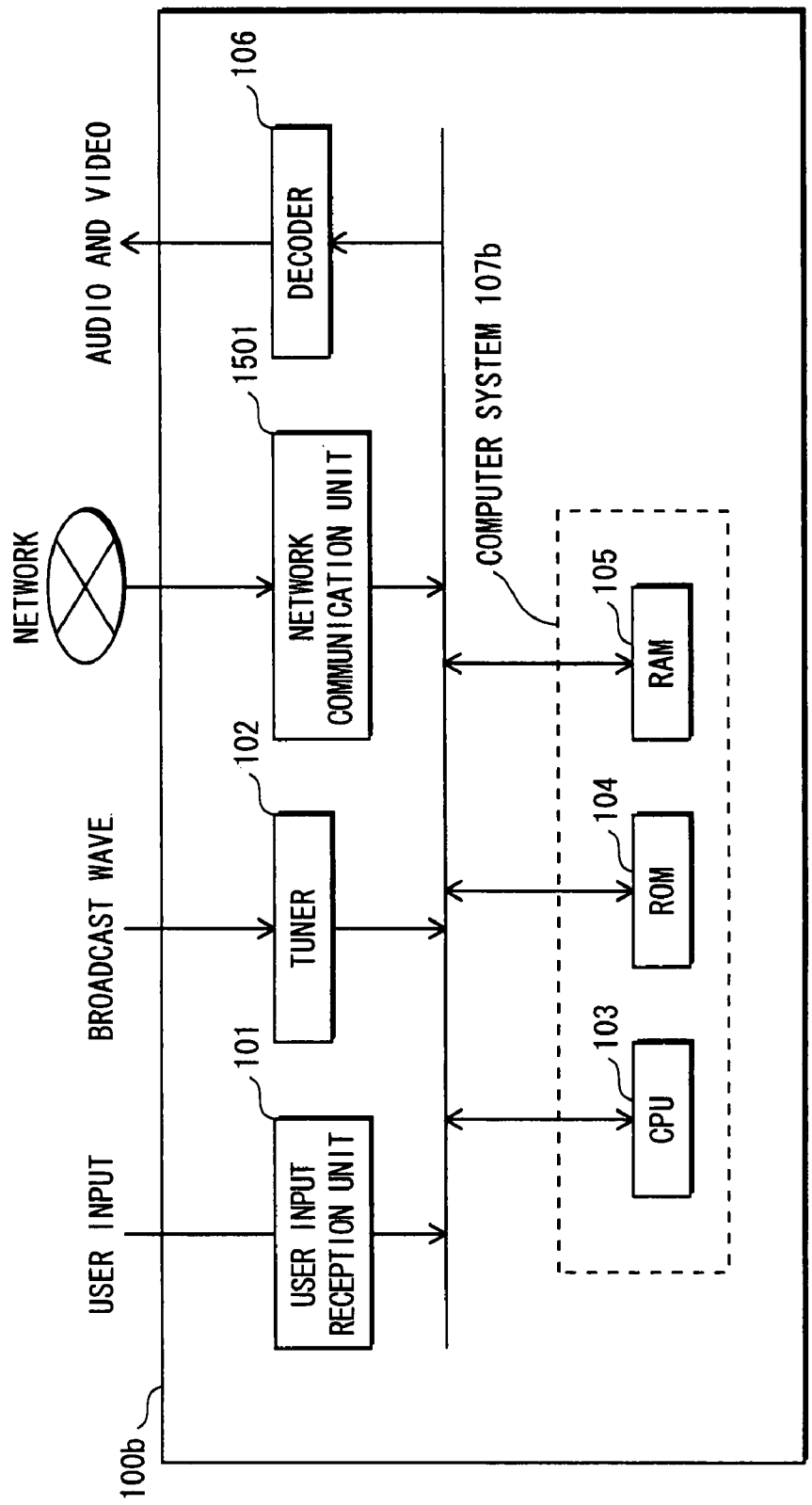
FIG. 15 shows the internal structure of a content recommendation apparatus 100b in a third embodiment.

The present embodiment targets not only content transmitted from a broadcast station when selecting content based on viewing motivation information, but also targets content distributed via a network or the like. FIG. 15 shows the internal structure of a content recommendation apparatus 100b of the present embodiment. In addition to the structure of the first embodiment, the content recommendation apparatus 100b includes a network communication unit 1501 and a computer system 107b.

The network communication unit 1501 acquires content, content information and newest content information distributed via a network, and also web information and newest web information searched for via a network.

Figure 16:
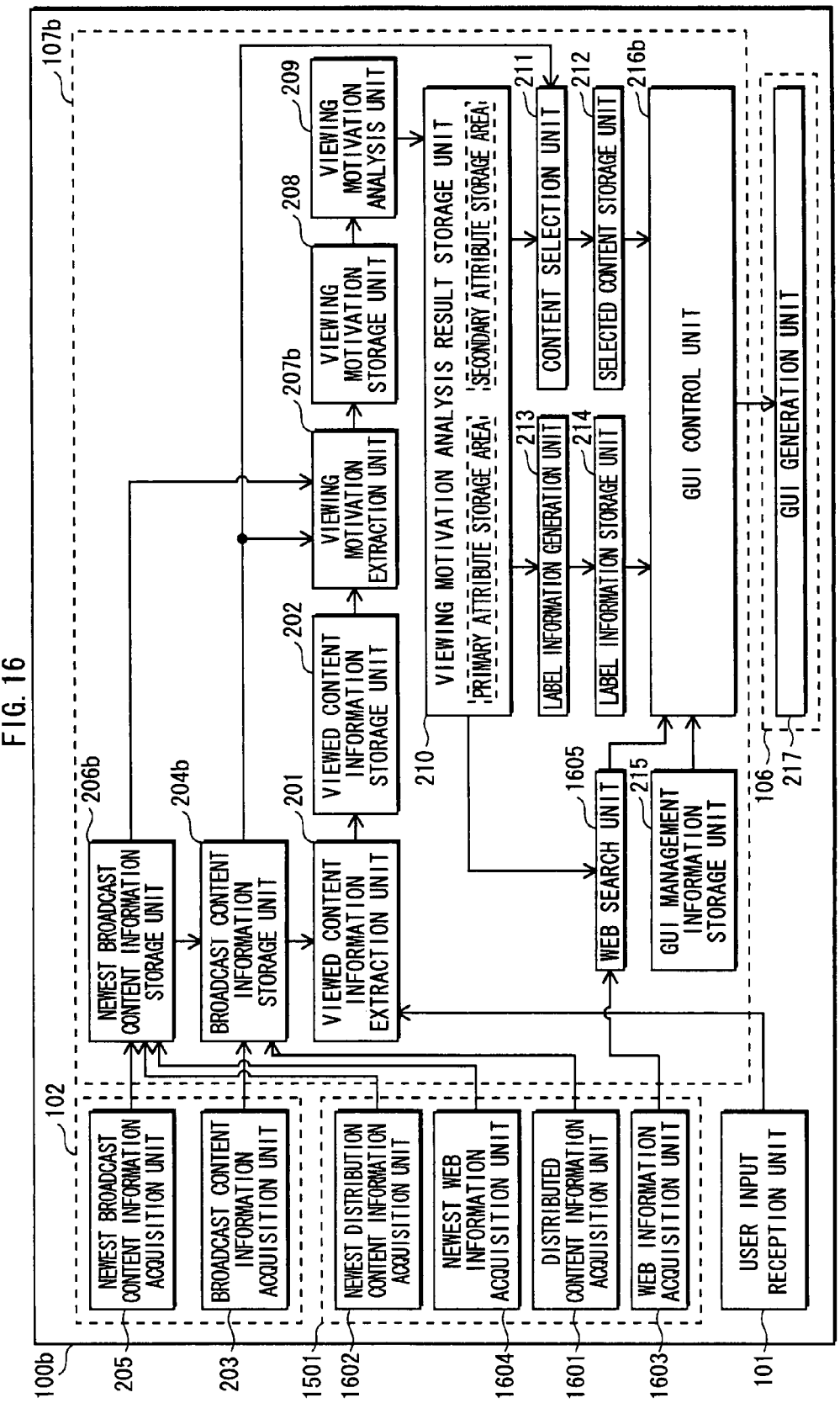
FIG. 16 is a function block diagram showing the structure of the content recommendation apparatus 100b in the third embodiment.

FIG. 16 is a function block diagram showing the structure of the content recommendation apparatus 100b of the present embodiment. In addition to the structure of the first embodiment, the content recommendation apparatus 100b includes a distributed content information acquisition unit 1601, a newest distributed content information acquisition unit 1602, a web information acquisition unit 1603, a newest web information acquisition unit 1604, and a web search unit 1605. Furthermore, instead of the broadcast content information storage unit 204 and the newest broadcast content information storage unit 206, the content recommendation apparatus 100b has a content information storage unit 204b and a newest content information storage unit 206b.

The distributed content information acquisition unit 1601 acquires content information distributed over a network.

The newest distributed content information acquisition unit 1602 acquires newest content information distributed over a network. The web information acquisition unit 1603 acquires web information.

The newest web information acquisition unit 1604 acquires newest web information.

The web search unit 1605 searches web information based on a result of analyzing viewing motivation information.

The content information storage unit 204b stores content information acquired by the broadcast content information acquisition unit 203, and content information acquired by the distributed content information acquisition unit 1601.

The newest content information storage unit 206b stores newest content information acquired by the newest broadcast content information storage unit 205, newest content information acquired by the newest distributed content information acquisition unit 1602, and newest web information acquired by the newest web information acquisition unit 1604.

The viewing motivation extraction unit 207b of the present embodiment extracts viewing motivation information of a user with respect to viewed content, based on content information stored in the content information storage unit 204b and content information stored in the viewed content information storage unit 202.

The GUI control unit 216b of the present embodiment performs GUI control for displaying the content selected by the content selection unit 211 and web information found by the web search unit 1705 in correspondence with the label information that was a selection factor, based on the management information stored in the GUI management information storage unit 215.

Figure 17:
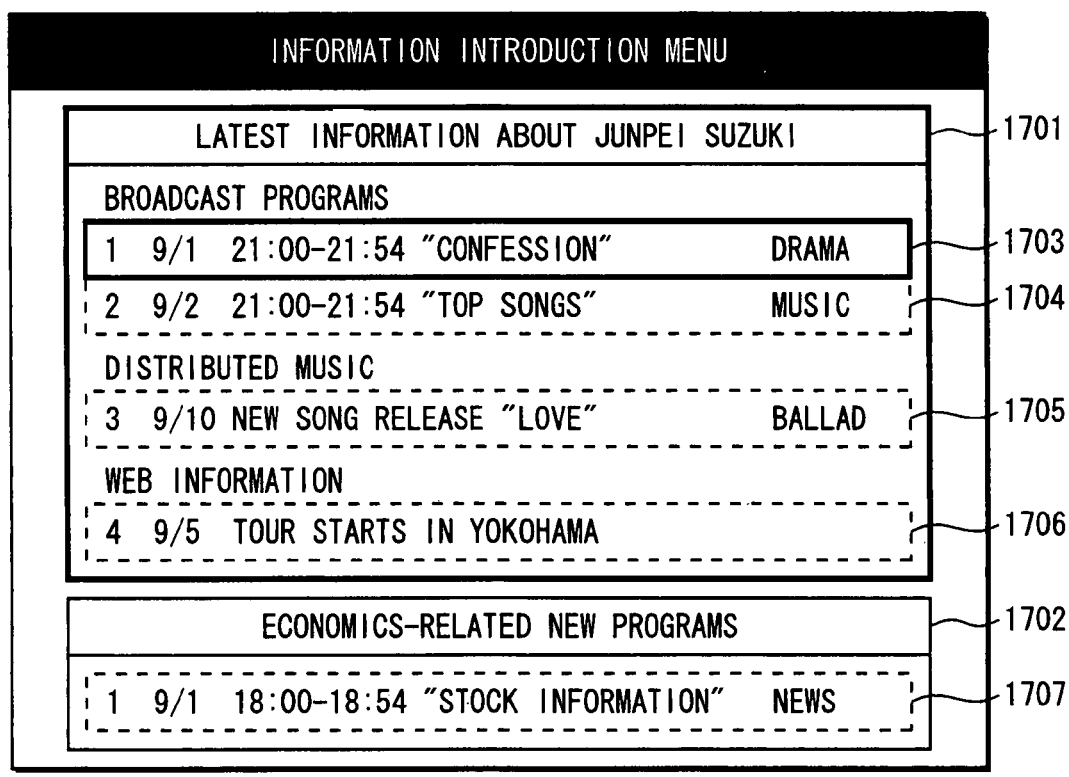
FIG. 17 shows an example of a GUI generated by the GUI generation unit 217 in the third embodiment.

FIG. 17 shows an example of display of a GUI generated by the GUI generation unit 217 under the control of the GUI control unit 216b. Label information stored in the label information storage unit 214 is displayed as shown by label information 1701 and 1702, and selected content stored in the selected content storage unit 212 and web information found by the web search unit 1605 are displayed grouped under the corresponding viewing motivation. This enables the user to ascertain the selected content and web information by viewing motivation.

Next, a description is given of user operations when a content introduction menu such as shown in FIG. 17 is displayed. The user first selects a desired label information group from among label information 1701 and 1702 by moving the cursor shown on the label information 1701 in FIG. 17 up and down. If, for instance, the user has selected the label information 1701, the user then selects content or web information that he or she wishes to view from among the content information 1703, 1704, 1705 and 1706 by moving the cursor shown on the content information 1703 in FIG. 17 up and down. By confirming the selection, the selected content or web information will be viewed.

Supplementary Remarks

Although the content recommendation apparatus of the present invention has been described based on embodiments, the present invention is by no means limited to the described embodiments.

Although an example of an algorithm for analyzing viewing motivation information is given above, any other algorithm that is suitable for determining whether content is viewed or not viewed, and extracts a rule consisting of an attribute and an attribute value may be used.

Although content is described as being television programs in the above, the present invention can also be applied to a case in which the content is music. For instance, attributes may be bibliographical information and a type of a music characteristic amount, and the attribute values may be the name and value thereof. The viewing motivation (note that "viewing" should be interpreted as including the concept of "listening") for each user may be selected from music listening history, and music may be displayed classified by "viewing" motivation. Furthermore, labeling display based on the viewing motivation information and reconstruction of the viewing motivation information are possible. Note that the bibliographic information may, for instance, be genre or artist, and the music characteristic amount may, for instance, be frequency change or power spectrum, tempo, beat or sound quality. The present invention may also be applied to content other than music.

In the first embodiment, the viewing motivation extraction unit 207 may extract a characteristic keyword from the newest content information stored in the newest broadcast content information storage unit 206, based on the extracted viewing motivation information, and expand the corresponding viewing motivation. Using the above example of viewing motivation information, based on keywords expressing other actors being promoted to catch up to Performer: Shinji Otake, or latest information relating to Shinji Otake, [Performed: Shinji Otake] may, for instance, be expanded to [Performer: Shinji Otake or Noboru Ueda or Youhei Ishii].

Furthermore, the viewing motivation extraction unit 207b described in the third embodiment may extract characteristic keywords from newest content information acquired by the newest broadcast content information acquisition unit 205 and the newest distributed content information acquisition unit 206, and newest web information acquired by the newest web information acquisition unit 1604, based on the extracted viewing motivation information, and expand the viewing motivation information based on the extracted characteristic keywords.

Furthermore, a possible case is one in which the content is divided into a plurality of television program segments, and the transmitted content information includes segment information. In this case, the viewed content information acquisition unit may acquire identification information of segments that the user has viewed. The viewed content information storage unit may store the acquired viewed segment information. The viewing motivation extraction unit may analyze the motivation of the user to view segments based on the segment information and the viewed segment information, and based on the analysis results, the content selection unit may select a segment or segments from broadcast content or distributed content.

Although a content recommendation apparatus is used in the described embodiments, the present invention may be a method including steps shown by one or more of the flowcharts, a computer program that includes program code for causing a computer to execute steps shown by one or more of the flowcharts, or an integrated circuit such as a system LSI. The system LSI is an IC, an LSI, super LSI, or ultra LSI, depending on the degree of integration.

Furthermore, the integration of circuits is not limited to being realized with LSI, but may be realized with a special-purpose circuit or a general-use processor. Alternatively, the integration may be realized with use of a FPGA (field programmable gate array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

The content recommendation apparatus of the present invention can be used managerially, in other words, repeatedly and continuously, in a manufacturing industry. By ascertaining the viewing motivation of user with respect to viewed content, the content recommendation apparatus is particularly effective as technology for selecting content having a high viewing possibility and searching web information. Furthermore, as a result of utilizing newest information and newest web information, the content recommendation apparatus is effective as technology for selecting highly topical content and searching for highly topical web information.

The invention claimed is:

1. A content recommendation apparatus, comprising:
a preference analysis unit operable to, with respect to each respective piece of content of a plurality of pieces of content already viewed by a user, (i) analyze a preference of the user, and (ii) generate a piece of viewing motivation information that is a combination of attribute entities of the respective piece of content;
a motivation analysis unit operable to, with respect to each respective generated piece of viewing motivation information of the generated pieces of viewing motivation information, (i) determine a primary viewing motivation portion of the respective generated piece of viewing motivation information that shows a portion of the respective generated piece of viewing motivation information that particularly motivated the user to view the respective piece of content, and (ii) divide the respective generated piece of viewing motivation information into the primary viewing motivation portion and a secondary viewing motivation portion;
a hierarchical structuring unit operable to cause a common primary viewing motivation portion of the primary viewing motivation portions of the generated pieces of viewing motivation information to be shared, and arrange the secondary viewing motivation portion below the common primary viewing motivation portion, so as to put the common primary viewing motivation portion and the secondary viewing motivation portion into a hierarchical structure;
a selection unit operable to select one or more pieces of content having a combination of the primary viewing motivation portion and the secondary viewing motivation portion as attribute entities; and a presentation unit operable to present, to the user, content information of the selected one or more pieces of content in correspondence with the primary viewing motivation portion and the secondary viewing motivation portion that have been put into the hierarchical structure, wherein each respective generated piece of viewing motivation information is a combination of attribute entities that, from among combinations of attribute entities of the respective piece of content, appears with a frequency equal to or higher than a predetermined threshold value in the content information of the plurality of pieces of already-viewed content.

2. The content recommendation apparatus of claim 1, wherein the primary viewing motivation portion of a respective generated piece of viewing motivation information is a combination of attribute entities that, from among combinations of attribute entities included in the respective generated piece of viewing motivation information, are included most frequently in other generated pieces of viewing motivation information generated by the preference analysis unit, and wherein the secondary viewing motivation portion of the respective generated piece of viewing motivation information is a combination of attribute entities included in the respective generated piece of viewing motivation information other than the attribute entities determined as the primary viewing motivation portion of the respective generated piece of viewing motivation information.

3. The content recommendation apparatus of claim 1, wherein the primary viewing motivation portion of a respective generated piece of viewing motivation information is a combination of attribute entities that are most frequently appearing combinations of attribute entities included in the generated pieces of viewing motivation information, and wherein the secondary viewing motivation portion of the respective generated piece of viewing motivation information is a combination of attribute entities included in the respective generated piece of viewing motivation information other than the attribute entities determined as the primary viewing motivation portion of the respective generated piece of viewing motivation information.

4. The content recommendation apparatus of claim 1, wherein the content recommendation apparatus further comprises a clock unit operable to clock time, wherein each respective piece of the plurality of already-viewed pieces of content corresponds to a date and time of viewing, and wherein each respective generated piece of viewing motivation information of each respective piece of the plurality of already-viewed pieces of content is a combination of attribute entities, from among combinations of attribute entities of content, for which, in a predetermined period of time, a ratio of (a) appearance times in the content information of the already-viewed pieces of content and (b) appearance times in the content information of all content is equal to or greater than a predetermined threshold value.

5. The content recommendation apparatus of claim 4, wherein the primary viewing motivation portion of a respective generated piece of viewing motivation information is a combination of attribute entities that, in the generated pieces of viewing motivation information in the predetermined period of time, are most frequently included in the content information of content viewed within a period of time that is longer that the predetermined period of time, and wherein the secondary viewing motivation portion of the respective generated piece of viewing motivation information is a combination of attribute entities included in the respective generated piece of viewing motivation information other than the attribute entities determined as the primary viewing motivation portion of the respective generated piece of viewing motivation information.

6. The content recommendation apparatus of claim 4, wherein the primary viewing motivation portion of a respective generated piece of viewing motivation information is a combination of attribute entities that, in the generated pieces of viewing motivation information in the predetermined period of time, are included in the content information of a piece of content having an oldest date and time that is before a predetermined point in time, and wherein the secondary viewing motivation portion of the respective generated piece of viewing motivation information is a combination of attribute entities included in the respective generated piece of viewing motivation information other than the attribute entities determined as the primary viewing motivation portion of the respective generated piece of viewing motivation information.

7. The content recommendation apparatus of claim 1, wherein the preference analysis unit includes a keyword extraction subunit operable to, based on the generated pieces of viewing motivation information, extract a characteristic keyword from newest information attached to content, or advertisement information.

8. The content recommendation apparatus of claim 1, wherein the content recommendation apparatus further comprises an information retrieval unit operable to, based on the generated pieces of viewing motivation information, retrieve information via a network, and wherein the selected one or more pieces of content includes the information retrieved by the information retrieval unit.

9. A content recommendation method, comprising analyzing by a processor, with respect to each respective piece of content of a plurality of pieces of content already viewed by a user, a preference of the user;

generating, with respect to each respective piece of content of the plurality of pieces of content already viewed by the user, a piece of viewing motivation information that is a combination of attribute entities of the respective piece of content;

determining, with respect to each respective generated piece of viewing motivation information of the generated pieces of motivation information, a primary viewing motivation portion of the respective generated piece of viewing motivation information that shows a portion of the respective generated piece of viewing motivation information that particularly motivated the user to view the respective piece of content;

dividing, with respect to each respective generated piece of viewing motivation information, the respective generated piece of viewing motivation information into the primary viewing motivation portion and a secondary viewing motivation portion;

hierarchical structuring to cause a common primary viewing motivation portion of the primary viewing motivation portions of the generated pieces of viewing motivation information to be shared, and arrange the secondary viewing motivation portion below the common primary viewing motivation portion, thereby putting so as to put the common primary viewing motivation portion and the secondary viewing motivation portion into a hierarchical structure;

selecting one or more pieces of content having a combination of the primary viewing motivation portion and the secondary viewing motivation portion as attribute entities; and presenting, to the user, content information of the selected one or more pieces of content in correspondence with the primary viewing motivation portion and the secondary viewing motivation portion that have been put into the hierarchical structure, wherein each respective generated piece of viewing motivation information is a combination of attribute entities that, from among combinations of attribute entities of the respective piece of content, appears with a frequency equal to or higher than a predetermined threshold value in the content information of the plurality of pieces of already-viewed content.

10. A computer-readable recording medium having a program recorded thereon, the program causing a computer to execute a method comprising:

analyzing, with respect to each respective piece of content of a plurality of pieces of content already viewed by a user, a preference of the user;

generating, with respect to each respective piece of content of the plurality of pieces of content already viewed by the user, a piece of viewing motivation information that is a combination of attribute entities of the respective piece of content;

determining, with respect to each respective generated piece of viewing motivation information of the generated pieces of motivation information, a primary viewing motivation portion of the respective generated piece of viewing motivation information that shows a portion of the respective generated piece of viewing motivation information that particularly motivated the user to view the respective piece of content;

dividing, with respect to each respective generated piece of viewing motivation information, the respective generated piece of viewing motivation information into the primary viewing motivation portion and a secondary viewing motivation portion;

hierarchical structuring to cause a common primary viewing motivation portion of the primary viewing motivation portions of the generated pieces of viewing motivation information to be shared, and arrange the secondary viewing motivation portion below the common primary viewing motivation portion, so as to put the common primary viewing motivation portion and the secondary viewing motivation portion into a hierarchical structure;

selecting one or more pieces of content having a combination of the primary viewing motivation portion and the secondary viewing motivation portion as attribute entities; and presenting, to the user, content information of the selected one or more pieces of content in correspondence with the primary viewing motivation portion and the secondary viewing motivation portion that have been put into hierarchical structure, wherein each respective generated piece of viewing motivation information is a combination of attribute entities that, from among combinations of attribute entities of the respective piece of content, appears with a frequency equal to or higher than a predetermined threshold value in the content information of the plurality of pieces of already-viewed content.

11. A content recommendation integrated circuit, comprising:

a preference analysis unit operable to, with respect to each respective piece of content of a plurality of pieces of content already viewed by a user, (i) analyze a preference of the user, and (ii) generate a piece of viewing motivation information that is a combination of attribute entities of the respective piece of content;

a motivation analysis unit operable to, with respect to each respective generated piece of viewing motivation information of the generated pieces of viewing motivation information, (i) determine a primary viewing motivation portion of the respective generated piece of viewing motivation information that shows a portion of the respective generated piece of viewing motivation information that particularly motivated the user to view the respective piece of content, and (ii) divide the respective generated piece of viewing motivation information into the primary viewing motivation portion and a secondary viewing motivation portion;

a hierarchical structuring unit operable to cause a common primary viewing motivation portion of the primary viewing motivation portions of the generated pieces of viewing motivation information to be shared, and arrange the secondary viewing motivation portion below the common primary viewing motivation portion, so as to put the common primary viewing motivation portion and the secondary viewing motivation portion into a hierarchical structure;

a selection unit operable to select one or more pieces of content having a combination of the primary viewing motivation portion and the secondary viewing motivation portion as attribute entities; and a presentation unit operable to present, to the user, content information of the selected one or more pieces of content in correspondence with the primary viewing motivation portion and the secondary viewing motivation portion that have been put into the hierarchical structure, wherein each respective generated piece of viewing motivation information is a combination of attribute entities that, from among combinations of attribute entities of the respective piece of content, appears with a frequency equal to or higher than a predetermined threshold value in the content information of the plurality of pieces of already-viewed content.

* * * * *